(12) United States Patent
Childers

(10) Patent No.: US 11,548,190 B2
(45) Date of Patent: Jan. 10, 2023

(54) NESTED ELLIPTIC REFLECTOR FOR CURING OPTICAL FIBERS

(71) Applicant: Phoseon Technology, Inc., Hillsboro, OR (US)

(72) Inventor: Doug Childers, Portland, OR (US)

(73) Assignee: Phoseon Technology, Inc., Hillsboro, OR (US)

( * ) Notice: Subject to any disclaimer, the term of this patent is extended or adjusted under 35 U.S.C. 154(b) by 0 days.

(21) Appl. No.: 17/119,974

(22) Filed: Dec. 11, 2020

(65) Prior Publication Data

US 2022/0184858 A1 Jun. 16, 2022

(51) Int. Cl.
| | |
|---|---|
| *B29C 35/08* | (2006.01) |
| *B01J 19/12* | (2006.01) |
| *B29C 35/10* | (2006.01) |
| *B29C 35/16* | (2006.01) |
| *G02B 5/08* | (2006.01) |
| *B29C 35/02* | (2006.01) |

(52) U.S. Cl.
CPC ......... *B29C 35/0805* (2013.01); *B01J 19/123* (2013.01); *B29C 35/0288* (2013.01); *B29C 35/10* (2013.01); *B29C 35/16* (2013.01); *G02B 5/0891* (2013.01); *B29C 2035/0838* (2013.01)

(58) Field of Classification Search
CPC ........ B29C 35/0805; B29C 2035/0827; B29C 64/277; B29C 65/1441; B29C 65/1641; B29C 66/81268; G02B 2006/12104; G02B 19/0019; G02B 23/105
See application file for complete search history.

(56) References Cited

U.S. PATENT DOCUMENTS

| | | | | |
|---|---|---|---|---|
| 5,301,249 | A | * | 4/1994 | Hamblen ............. G02B 6/4204 385/47 |
| 9,370,046 | B2 | | 6/2016 | Childers |
| 2015/0028020 | A1 | * | 1/2015 | Childers ................ B05D 3/067 219/553 |

FOREIGN PATENT DOCUMENTS

CN WO2011094947 * 2/2010

* cited by examiner

*Primary Examiner* — Stella K Yi
(74) *Attorney, Agent, or Firm* — McCoy Russell LLP

(57) ABSTRACT

Methods and systems are provided for ultra-violet curing, and in particular, for ultra-violet curing of optical fiber surface coatings. In one example, a curing device includes a first elliptic cylindrical reflector, with a second elliptic cylindrical reflector housed within the first elliptic cylindrical reflector. The first elliptic cylindrical reflector and second elliptic cylindrical reflector have a co-located focus, and a workpiece to be cured by the curing device may be arranged at the co-located focus.

14 Claims, 8 Drawing Sheets

NESTED ELLIPTIC REFLECTOR FOR CURING OPTICAL FIBERS

FIELD

The present description relates generally to methods and systems for ultra-violet curing, and in particular, for ultra-violet curing of optical fiber surface coatings.

BACKGROUND/SUMMARY

Optical fibers are used ubiquitously in lighting and imaging applications, as well as in the telecommunication industry, where they provide higher data transmission rates over longer distances as compared to electric wiring. In addition, optical fibers are more flexible, lighter, and can be drawn into thinner diameters than metal wiring, allowing for higher-capacity bundling of fibers into cables. Surface coatings, applied via an ultra-violet (UV) curing process, are employed to protect optical fibers from physical damage and moisture intrusion, and to maintain their long-term durability in performance. As a uniformity of curing of the surface coatings increases, a durability of the optical fibers may also increase. However, it is often difficult to provide sufficiently uniform curing of the surface coatings. One approach is to arrange a workpiece, such as an optical fiber, proximate to a UV light source, with the surface coatings being cured via UV light emitted by the UV light source. To increase an efficiency of the curing, a reflector may be used to direct a portion of the UV light back toward the workpiece. However, the UV light may be dispersed by the reflector in directions away from the workpiece, which may result in efficiency losses. Additionally, as a size of the reflector is increased, a distance of the workpiece from the UV light source may also increase, resulting in a reduction of UV light absorbed by the workpiece.

In one example, the issues described above may be addressed by a curing device, comprising: a larger, first elliptic cylindrical reflector and a smaller, second elliptic cylindrical reflector, with the second elliptic cylindrical reflector nested within an interior of the first elliptic cylindrical reflector, and with the first elliptic cylindrical reflector and the second elliptic cylindrical reflector arranged to have a co-located first focus. In this way, the first elliptic cylindrical reflector and the second elliptic cylindrical reflector nested within the first elliptic cylindrical reflector may each reflect light from a light source to a workpiece arranged at the co-located first focus.

As one example, an entirety of the second elliptic cylindrical reflector may seated within the interior of the first elliptic cylindrical reflector, with the co-located first focus arranged at a first opening of the second elliptic cylindrical reflector, between a closed end of the first elliptic cylindrical reflector and an opposing, second opening of the second elliptic cylindrical reflector. As a result, the workpiece arranged at the co-located first focus may be positioned closer to the light source, and a size of the curing device may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 3, 5, and 7-10 are shown to scale, although other relative dimensions may be used, if desired.

DETAILED DESCRIPTION

Figure 2:
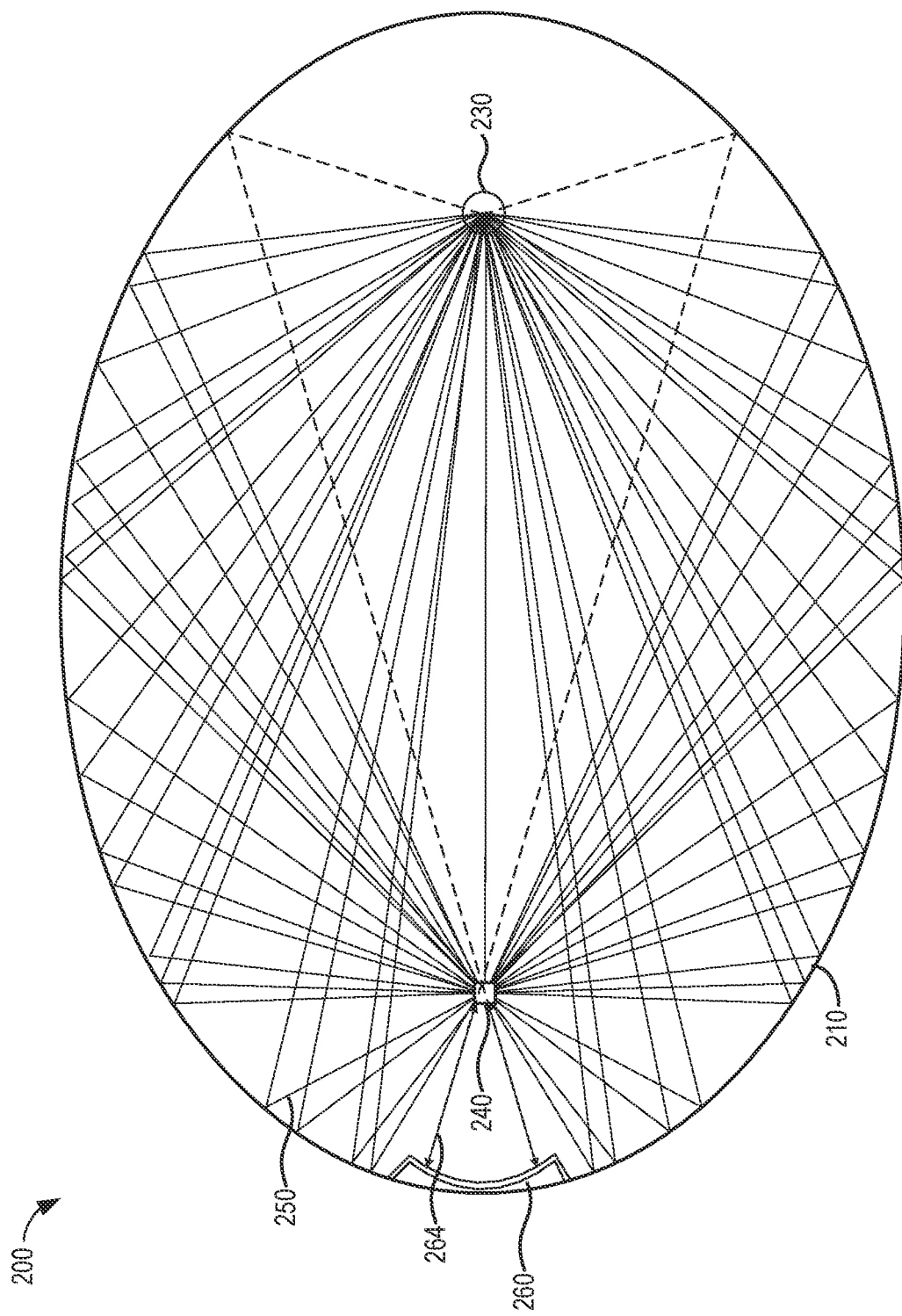
FIG. 2 shows a cross-section of an elliptic cylindrical reflector for a UV curing device with a single light source.
Figure 3:
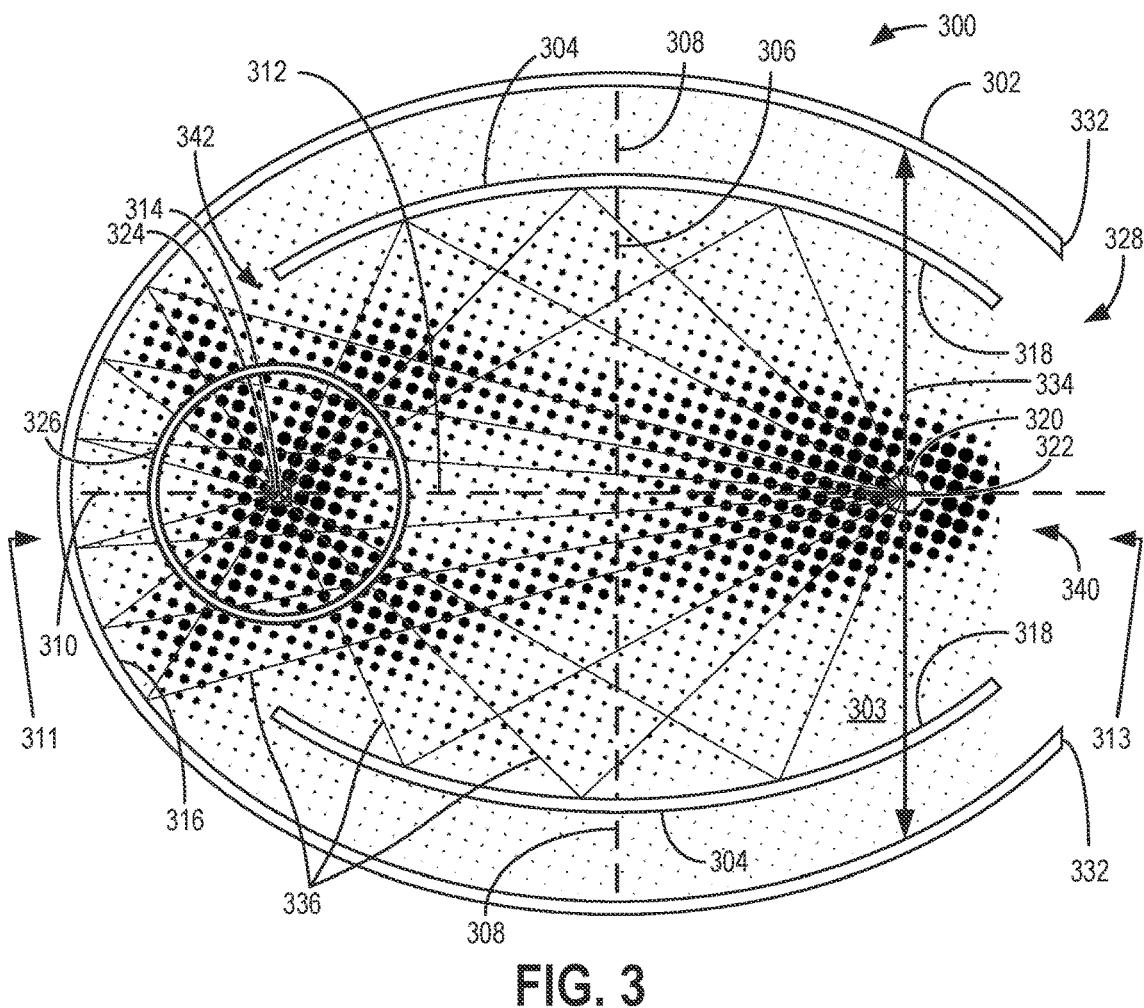
FIG. 3 shows a cross section of a first UV curing device including nested elliptic reflectors with a co-located focus.
Figure 4:
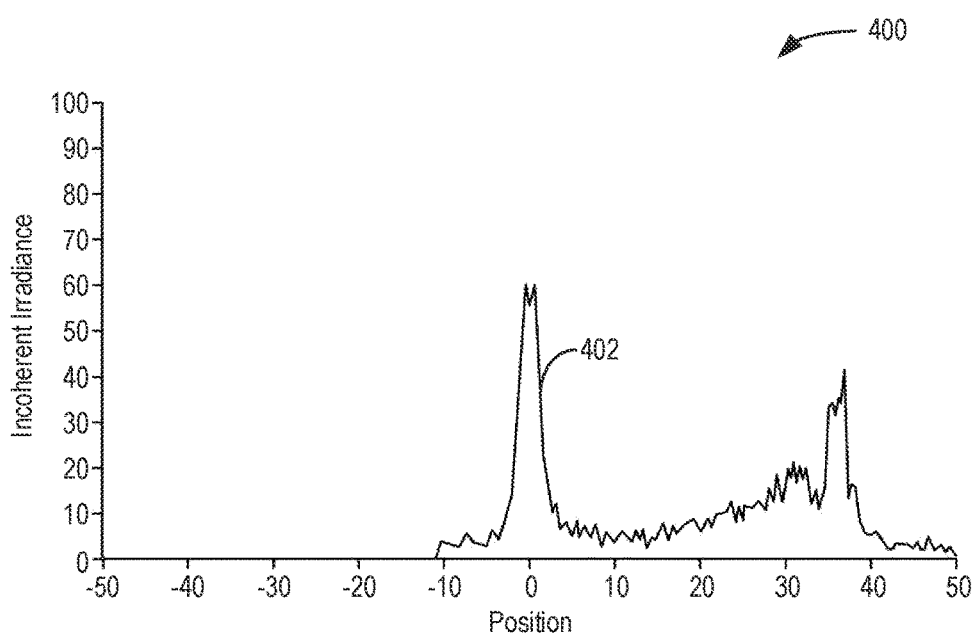
FIG. 4 shows a graph illustrating an incoherent irradiance versus position relationship of the UV curing device of FIG. 3.
Figure 5:
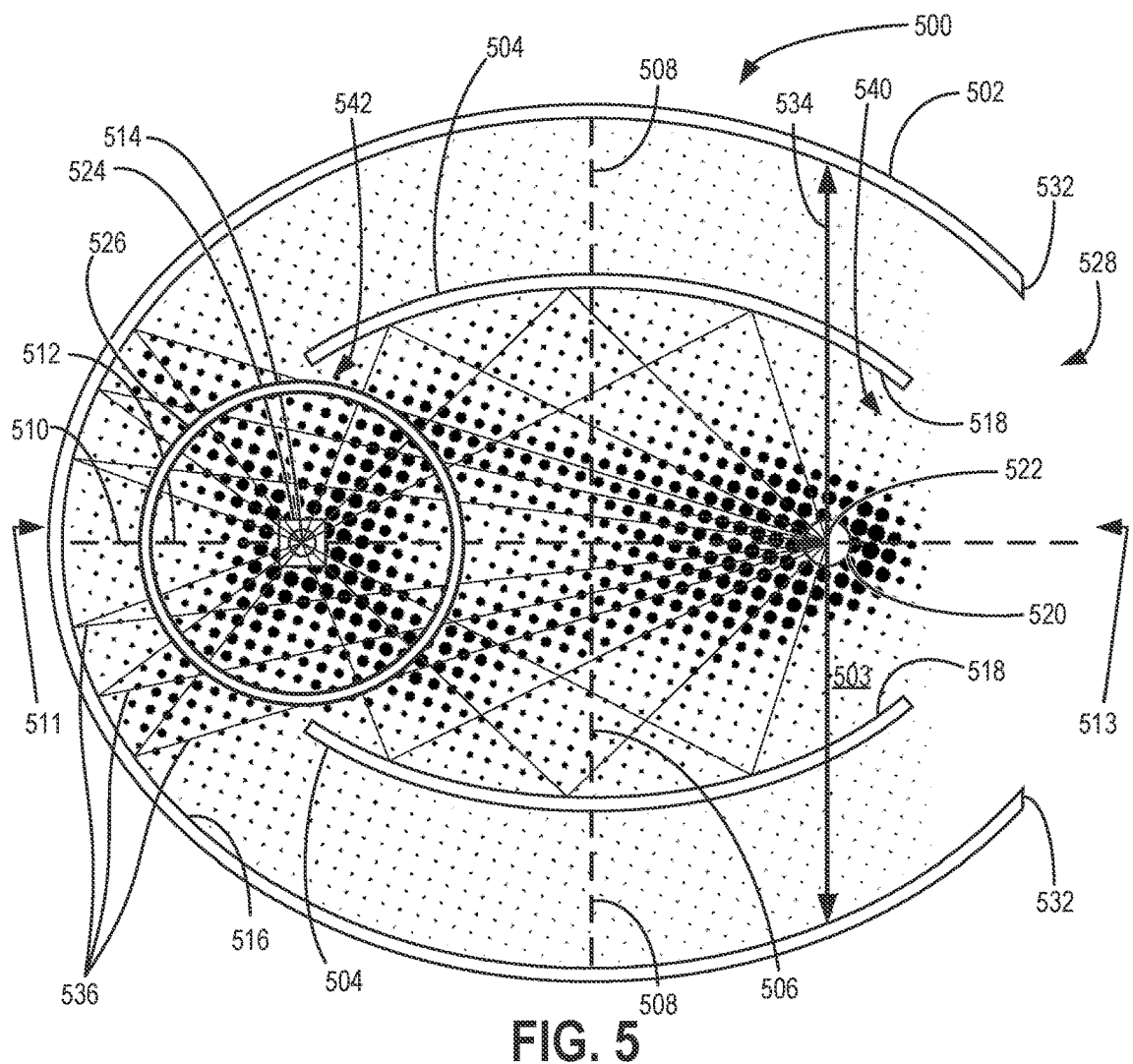
FIG. 5 shows a cross section of a second UV curing device including nested elliptic reflectors with a co-located focus.
Figure 6:
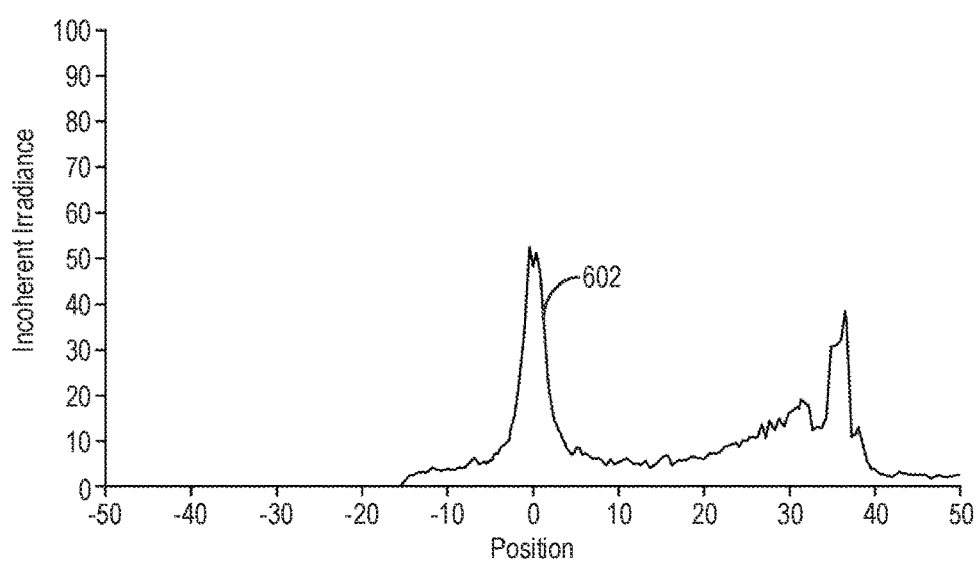
FIG. 6 shows a graph illustrating an incoherent irradiance versus position relationship of the UV curing device of FIG. 5.
Figure 7:
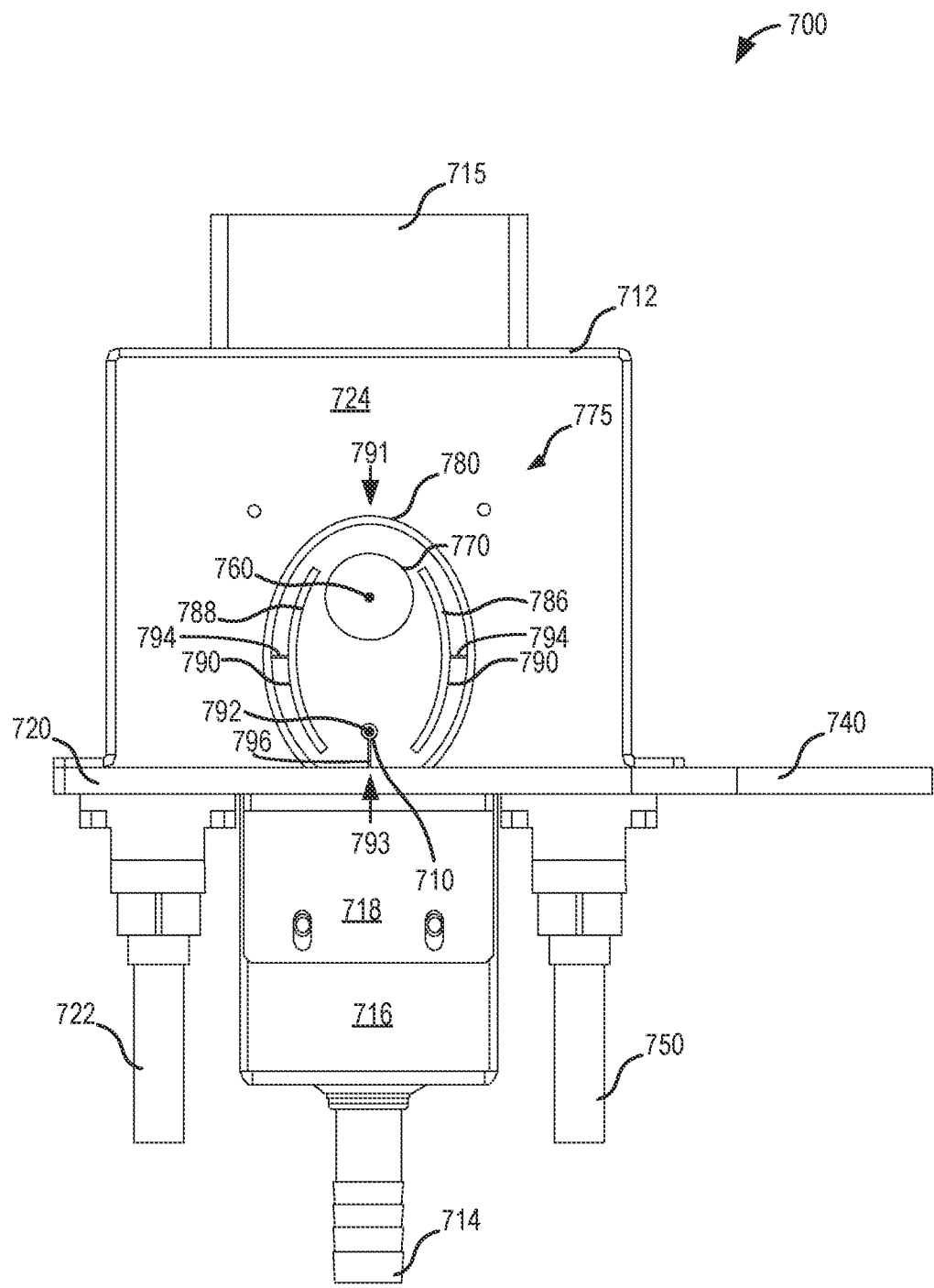
FIG. 7 illustrates a cross-section of an example photoreactive system including a UV curing device with nested elliptic reflectors having a co-located focus.
Figure 8:
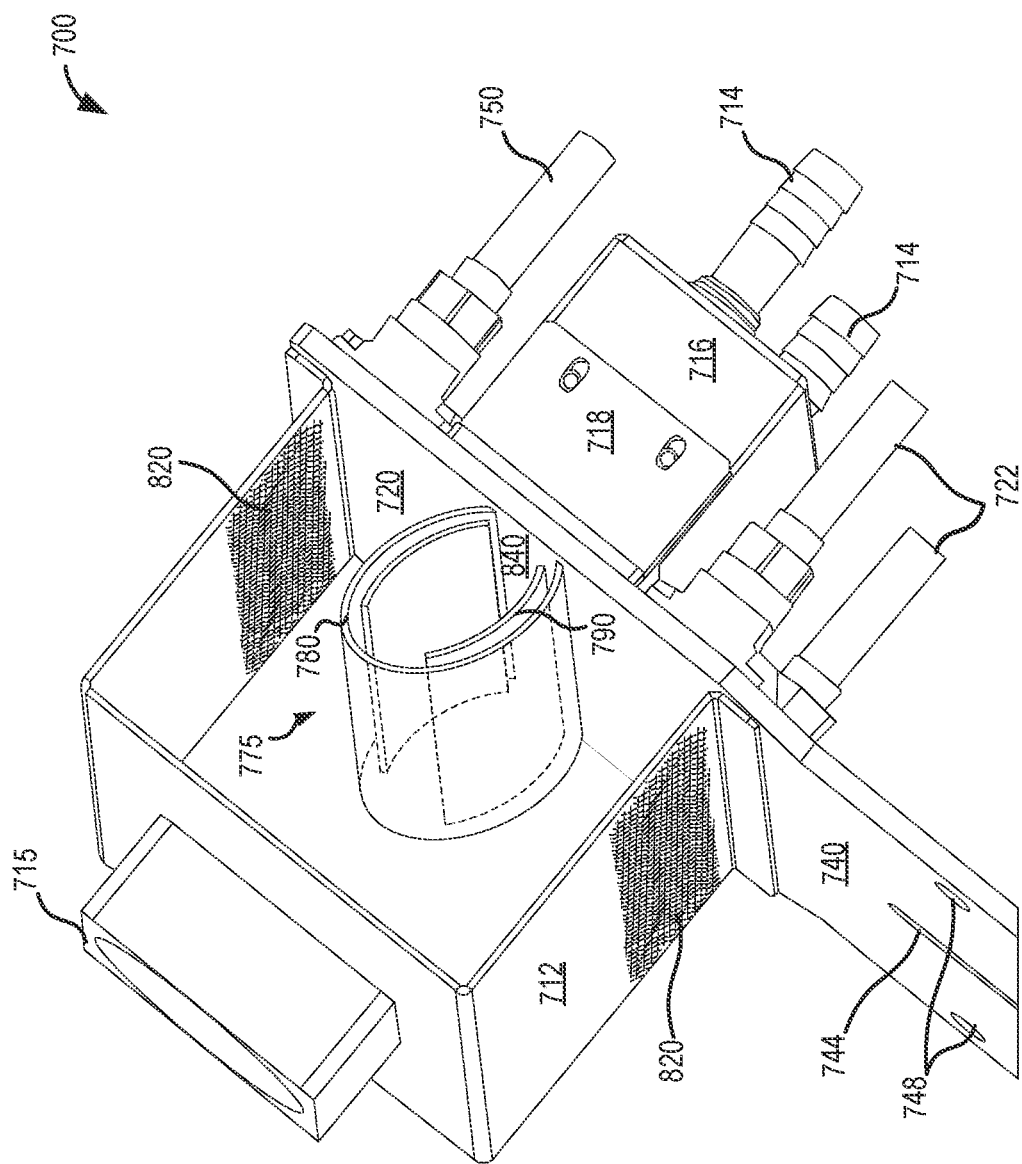
FIG. 8 illustrates a perspective cross-section of an example photoreactive system.
Figure 10:
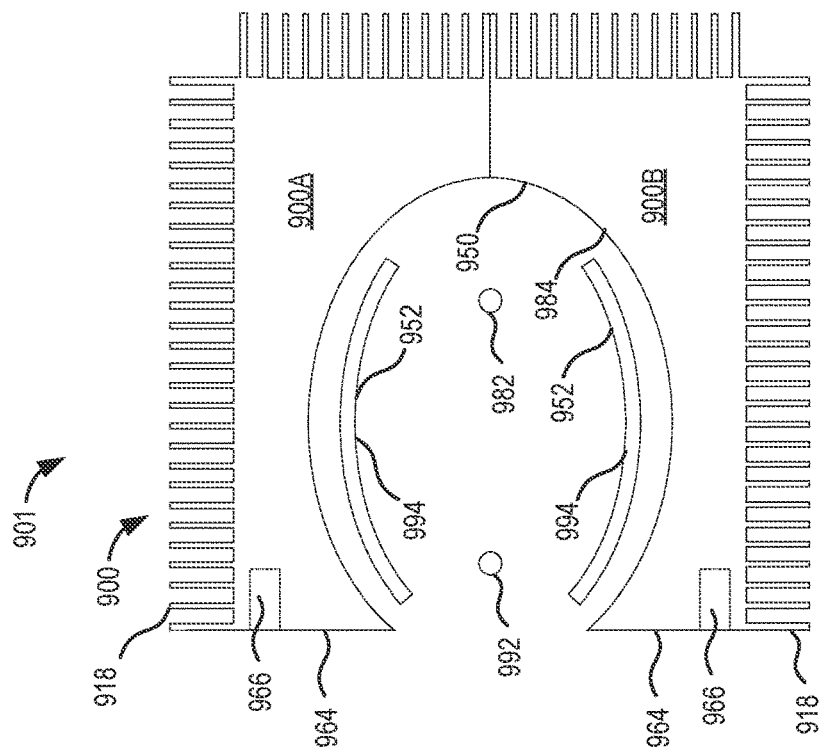
FIG. 10 illustrates an end cross-section of the nested elliptic reflector of FIG. 9.
Figure 9:
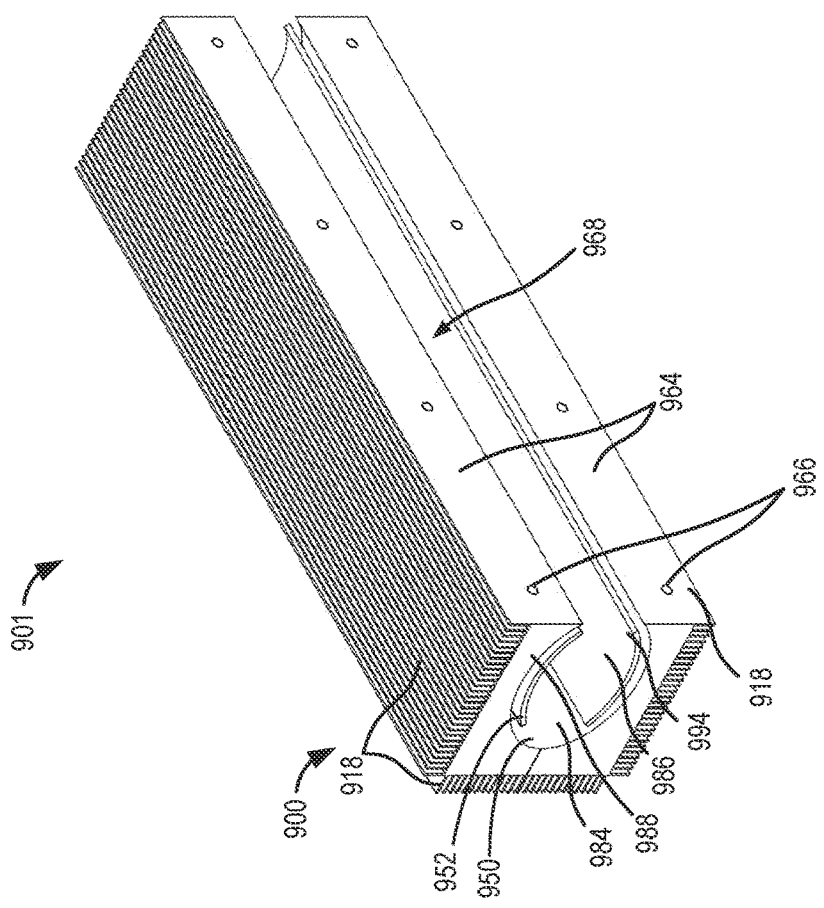
FIG. 9 illustrates a perspective view of a nested elliptic reflector for a photoreactive system.

The following description relates to systems and methods for a UV curing device, and in particular, a UV curing device for ultra-violet curing of optical fiber surface coatings. The UV curing device may be included within a photoreactive system, such as the photoreactive system shown by FIG. 1. Conventionally, UV curing devices include a single elliptic reflector, as shown by FIG. 2. However, the UV curing devices according to the present disclosure include nested elliptic reflectors, as shown by FIGS. 3 and 5. The nested elliptic reflectors include an outer, first elliptic reflector housing an inner, second elliptic reflector. The first elliptic reflector and the second elliptic reflector are configured such that a first focus of the first elliptic reflector and a first focus of the second elliptic reflector are each arranged at a same location. A light source positioned at a second focus of the first elliptic reflector directs UV light rays toward a workpiece, such as an optical fiber, arranged at the first focus. The UV light rays may be reflected toward the workpiece by reflective surfaces of the first elliptic reflector and second elliptic reflector, resulting in an increased UV light irradiance at the location of the workpiece, as illustrated by the graphs of FIGS. 4 and 6. The elliptic reflectors may be arranged within a housing of the UV curing device, as illustrated by FIGS. 7-8, and one or both of the elliptic reflectors may be formed from separate pieces, as illustrated by FIGS. 9-10. The workpiece may be cured via the UV curing device according to the example method illustrated by the flowchart of FIG. 11. By configuring the UV curing device to include the nested elliptic reflectors, the UV irradiance at the location of the workpiece is increased relative to conventional UV curing devices. The increased irradiance may reduce a curing time of the workpiece, which may increase production efficiency and reduce costs. Additionally, due to the increased irradiance provided by the nested reflectors, an amount of power consumed by the light source to generate the UV radiation for curing the workpiece may be reduced and a size and/or complexity of the light source may be decreased as a result, which may additionally lower an operating cost and/or manufacturing cost of the UV curing device.

Figure 1:
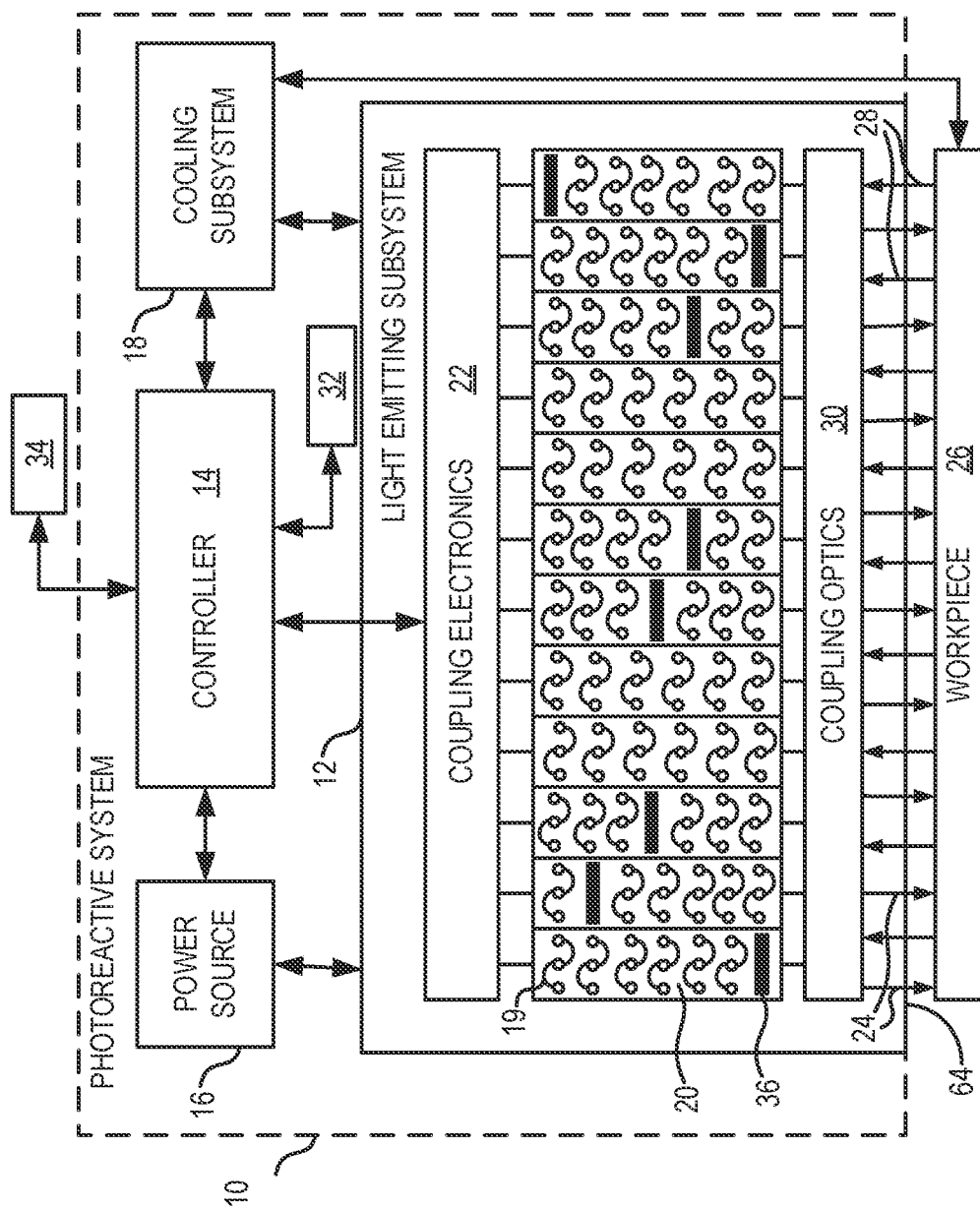
FIG. 1 shows an example of a photoreactive system, comprising a power source, a controller, and a light-emitting subsystem.

Referring to FIG. 1, a block diagram for an example configuration of a photoreactive system, such as curing device 10 (which may be referred to herein as a UV curing device), is shown. Curing device 10 comprises a light-emitting subsystem 12, a controller 14, a power source 16 and a cooling subsystem 18. The light-emitting subsystem 12 may comprise a plurality of semiconductor devices 19. The plurality of semiconductor devices 19 may be an array 20 of light-emitting elements such as a linear array of LED devices, for example. Array 20 of light-emitting elements may also comprise a two-dimensional array of LED devices, or an array of LED arrays, for example. Semiconductor devices may provide radiant output 24. The radiant output 24 may be directed to a workpiece 26 located at a fixed plane from curing device 10. Returned radiation 28 may be directed back to the light-emitting subsystem 12 from the workpiece 26 (e.g., via reflection of the radiant output 24).

The radiant output 24 may be directed to the workpiece 26 via coupling optics 30. The coupling optics 30 may be variously implemented. As an example, the coupling optics may include one or more layers, materials or other structures interposed between the semiconductor devices 19 and window 64, and providing radiant output 24 to surfaces of the workpiece 26. As an example, the coupling optics 30 may include a micro-lens array to enhance collection, condensing, collimation or otherwise the quality or effective quantity of the radiant output 24. As another example, the coupling optics 30 may include a micro-reflector array. In employing such a micro-reflector array, each semiconductor device providing radiant output 24 may be disposed in a respective micro-reflector, on a one-to-one basis. As another example, array 20 of light-emitting elements providing radiant output 24 may be disposed in macro-reflectors, on a many-to-one basis. In this manner, coupling optics 30 may include both micro-reflector arrays, wherein each semiconductor device is disposed on a one-to-one basis in a respective micro-reflector, and macro-reflectors wherein the quantity and/or quality of the radiant output 24 from the semiconductor devices is further enhanced by macro-reflectors. For example, macro-reflectors may comprise elliptic cylindrical reflectors, parabolic reflectors, nested elliptic cylindrical reflectors, and the like.

Each of the layers, materials or other structure of coupling optics 30 may have a selected index of refraction. By properly selecting each index of refraction, reflection at interfaces between layers, materials and other structures in the path of the radiant output 24 (and/or returned radiation 28) may be selectively controlled. As an example, by controlling differences in such indexes of refraction at a selected interface, for example window 64, disposed between the semiconductor devices and the workpiece 26, reflection at that interface may be reduced or increased so as to enhance the transmission of radiant output at that interface for ultimate delivery to the workpiece 26. For example, the coupling optics may include a dichroic reflector where certain wavelengths of incident light are absorbed, while others are reflected and focused to the surface of workpiece 26.

The coupling optics 30 may be employed for various purposes. Example purposes include, among others, to reduce a likelihood of degradation of the semiconductor devices 19, to retain cooling fluid associated with the cooling subsystem 18, to collect, condense, and/or collimate the radiant output 24, to collect, direct, or reject returned radiation 28, or for other purposes, alone or in combination. As a further example, the curing device 10 may employ coupling optics 30 so as to enhance the effective quality, uniformity, or quantity of the radiant output 24, particularly as delivered to the workpiece 26.

The plurality of semiconductor devices 19 may be coupled to the controller 14 via coupling electronics 22, so as to provide data to the controller 14. As described further below, the controller 14 may also be implemented to control such data-providing semiconductor devices (e.g., via the coupling electronics 22). The controller 14 may be connected to, and may be implemented to control, the power source 16, and the cooling subsystem 18. For example, the controller may supply a larger drive current to light-emitting elements distributed in the middle portion of array 20 and a smaller drive current to light-emitting elements distributed in the end portions of array 20 in order to increase the useable area of light irradiated at workpiece 26. Moreover, the controller 14 may receive data from power source 16 and cooling subsystem 18. In one example, the irradiance at one or more locations at the workpiece 26 surface may be detected by sensors and transmitted to controller 14 in a feedback control scheme. In a further example, controller 14 may communicate with a controller of another lighting system (not shown in FIG. 1) to coordinate control of both lighting systems. For example, controllers 14 of multiple lighting systems may operate in a master-slave cascading control algorithm, where the setpoint of one of the controllers is set by the output of the other controller. Other control strategies for operation of curing device 10 in conjunction with another lighting system may also be used. As another example, controllers 14 for multiple lighting systems arranged side by side may control lighting systems in an identical manner for increasing uniformity of irradiated light across multiple lighting systems.

In addition to the power source 16, cooling subsystem 18, and light-emitting subsystem 12, the controller 14 may also be connected to, and implemented to control internal element 32, and external element 34. Internal element 32, as shown, may be internal to the curing device 10, while external element 34, as shown, may be external to the curing device 10, but may be associated with the workpiece 26 (e.g., handling, cooling or other external equipment) or may be otherwise related to a photoreaction (e.g. curing) that curing device 10 supports.

The data received by the controller 14 from one or more of the power source 16, the cooling subsystem 18, the light-emitting subsystem 12, and/or internal element 32 and external element 34, may be of various types. As an example, the data may be representative of one or more characteristics associated with coupled semiconductor devices 19. As another example, the data may be representative of one or more characteristics associated with the respective light-emitting subsystem 12, power source 16, cooling subsystem 18, internal element 32, and external element 34 providing the data. As still another example, the data may be representative of one or more characteristics associated with the workpiece 26 (e.g., representative of the radiant output energy or spectral component(s) directed to the workpiece). Moreover, the data may be representative of some combination of these characteristics.

The controller 14, in receipt of any such data, may be implemented to respond to that data. For example, responsive to such data from any such component, the controller 14 may be implemented to control one or more of the power source 16, cooling subsystem 18, light-emitting subsystem 12 (including one or more such coupled semiconductor devices), and/or the internal element 32 and external element 34. As an example, responsive to data from the light-emitting subsystem indicating that the light energy is lower than a threshold amount of light energy at one or more points associated with the workpiece (e.g., where the threshold amount of light energy corresponds to an amount of light energy desirable for curing of the workpiece 26), the controller 14 may be implemented to either (a) increase the power source's supply of power to one or more of the semiconductor devices, (b) increase cooling of the light-emitting subsystem via the cooling subsystem 18 (e.g., certain light-emitting devices, if cooled, provide greater radiant output), (c) increase the time during which the power is supplied to such devices, or (d) a combination of any of the above.

Individual semiconductor devices 19 (e.g., LED devices) of the light-emitting subsystem 12 may be controlled independently by controller 14. For example, controller 14 may control a first group of one or more individual LED devices to emit light of a first intensity, wavelength, and the like, while controlling a second group of one or more individual LED devices to emit light of a different intensity, wavelength, and the like. The first group of one or more individual LED devices may be within the same array 20 of light-emitting elements, or may be from more than one array 20 of light-emitting elements from multiple lighting systems. Array 20 of light-emitting elements may also be controlled independently by controller 14 from other arrays of light-emitting elements (e.g., semiconductor devices 19) in other lighting systems. For example, the semiconductor devices of a first array may be controlled to emit light of a first intensity, wavelength, and the like, while those of a second array in another curing device may be controlled to emit light of a second intensity, wavelength, and the like.

As a further example, under a first set of conditions (e.g. for a specific workpiece, photoreaction, and/or set of operating conditions) controller 14 may operate curing device 10 to implement a first control strategy, whereas under a second set of conditions (e.g. for a specific workpiece, photoreaction, and/or set of operating conditions) controller 14 may operate curing device 10 to implement a second control strategy. As described above, the first control strategy may include operating a first group of one or more individual semiconductor devices (e.g., LED devices) to emit light of a first intensity, wavelength, and the like, while the second control strategy may include operating a second group of one or more individual LED devices to emit light of a second intensity, wavelength, and the like. The first group of LED devices may be the same group of LED devices as the second group, and may span one or more arrays of LED devices, or may be a different group of LED devices from the second group, but the different group of LED devices may include a subset of one or more LED devices from the second group.

The cooling subsystem 18 may be implemented to manage the thermal behavior of the light-emitting subsystem 12. For example, the cooling subsystem 18 may provide for cooling of light-emitting subsystem 12, and more specifically, the semiconductor devices 19. The cooling subsystem 18 may also be implemented to cool the workpiece 26 and/or the space between the workpiece 26 and the curing device 10 (e.g., the light-emitting subsystem 12). For example, cooling subsystem 18 may comprise an air or other fluid (e.g., water) cooling system. Cooling subsystem 18 may also include cooling elements such as cooling fins attached to the semiconductor devices 19, or array 20 thereof, or to the coupling optics 30. For example, cooling subsystem may include blowing cooling air over the coupling optics 30, wherein the coupling optics 30 are equipped with external fins to enhance heat transfer.

The curing device 10 may be used for various applications. Examples include, without limitation, curing applications for fiber optics, ink printing, the fabrication of DVDs and lithography, etc. The applications in which the curing device 10 may be employed can have associated operating parameters. That is, an application may have associated operating parameters as follows: provision of one or more levels of radiant power, at one or more wavelengths, applied over one or more periods of time. In order to properly accomplish the photoreaction associated with the application, optical power may be delivered at or near the workpiece 26 at or above one or more predetermined levels of one or a plurality of these parameters (and/or for a certain time, times or range of times).

In order to follow an intended application's parameters, the semiconductor devices 19 providing radiant output 24 may be operated in accordance with various characteristics associated with the application's parameters (e.g., temperature, spectral distribution and radiant power). At the same time, the semiconductor devices 19 may have certain operating specifications, which may be associated with the semiconductor devices' fabrication and, among other things, may be followed in order to reduce a likelihood of degradation of the devices. Other components of the curing device 10 may also have associated operating specifications. These specifications may include ranges (e.g., maximum and minimum) for operating temperatures and applied electrical power, among other parameter specifications.

Accordingly, the curing device 10 may support monitoring of the application's parameters. In addition, the curing device 10 may provide for monitoring of semiconductor devices 19, including their respective characteristics and specifications. Moreover, the curing device 10 may also provide for monitoring of selected other components of the curing device 10, including its characteristics and specifications.

Providing such monitoring may enable verification of the system's proper operation so that operation of curing device 10 may be reliably evaluated. For example, curing device 10 may be operating undesirably with respect to one or more of the application's parameters (e.g. temperature, spectral distribution, radiant power, and the like), any component's characteristics associated with such parameters, and/or any component's respective operating specifications. The provision of monitoring may be responsive and carried out in accordance with the data received by the controller 14 from one or more of the system's components.

Monitoring may also support control of the system's operation. For example, a control strategy may be implemented via the controller 14, the controller 14 receiving and being responsive to data from one or more system components. This control strategy, as described above, may be implemented directly (e.g., by controlling a component through control signals directed to the component, based on data respecting that components operation) or indirectly (e.g., by controlling a component's operation through control signals directed to adjust operation of other components). As an example, a semiconductor device's radiant output may be adjusted indirectly through control signals directed to the power source 16 that adjust power applied to the light-emitting subsystem 12 and/or through control signals directed to the cooling subsystem 18 that adjust cooling applied to the light-emitting subsystem 12.

Control strategies may be employed to enable and/or enhance the system's proper operation and/or performance of the application. In a more specific example, control may also be employed to enable and/or enhance balance between the array's radiant output and its operating temperature (e.g., to reduce a likelihood of heating the semiconductor devices 19 above a desired threshold operating temperature while also directing sufficient radiant energy to the workpiece 26), so as to carry out a photoreaction of the application.

In some applications, high radiant power may be delivered to the workpiece 26. Accordingly, the light-emitting subsystem 12 may be implemented using an array 20 of light-emitting elements (e.g., semiconductor devices 19). For example, the light-emitting subsystem 12 may be implemented using a high-density, light-emitting diode (LED) array. Although LED arrays may be used and are described in detail herein, it is understood that the semiconductor devices 19, and arrays thereof (e.g., array 20), may be implemented using other light-emitting technologies without departing from the principles of the invention; examples of other light-emitting technologies include, without limitation, organic LEDs, laser diodes, other semiconductor lasers.

Continuing with FIG. 1, the plurality of semiconductor devices 19 may be provided in the form of arrays (e.g., array 20), or an array of arrays (e.g., as shown in FIG. 1). The array may be implemented so that one or more, or most of the semiconductor devices 19 are configured to provide radiant output. At the same time, however, one or more of the array's semiconductor devices 19 may be implemented so as to provide for monitoring of a selection of the array's characteristics. For example, monitoring devices 36 may be selected from among the devices in the array and, for example, may have the same structure as the other, emitting devices. A difference between emitting devices and monitoring devices may be determined by the coupling electronics 22 associated with the particular semiconductor device (e.g., in a basic form, an LED array may have monitoring LED devices where the coupling electronics provides a reverse current, and emitting LED devices where the coupling electronics provides a forward current).

Furthermore, based on coupling electronics, the semiconductor devices in the array may be either/both multifunction devices and/or multimode devices, where (a) multifunction devices may be capable of detecting more than one characteristic (e.g., either radiant output, temperature, magnetic fields, vibration, pressure, acceleration, and other mechanical forces or deformations) and may be switched among these detection functions in accordance with the application parameters or other determinative factors and (b) multimode devices may be capable of emission, detection and some other mode (e.g., off) and may be switched among modes in accordance with the application parameters or other determinative factors.

As described above, curing device 10 may be configured to receive workpiece 26. As an example, workpiece 26 may be a UV-curable optical fiber, ribbon, or cable. Furthermore, workpiece 26 may be positioned at or near a focus of coupling optics 30 of curing device 10. In this manner, UV light irradiated from curing device 10 may be directed via coupling optics to the surface of the workpiece for UV curing and driving the photoreactions thereat. Coupling optics 30 of curing device 10 may be configured to have a co-located focus, as will be further described below.

Turning now to FIG. 2, it illustrates an example of coupling optics comprising a single elliptic reflector 200. Single elliptic reflectors are used in conventional UV curing devices for curing coatings of optical fiber workpieces.

An ellipse, as described herein, is a plane curve that results from the intersection of a cone by a plane in a way that produces a closed curve, and is defined as the locus of all points of the plane whose distances to two fixed points (the foci of the ellipse) add to the same constant. The distance between antipodal points on the ellipse, or pairs of points whose midpoint is at the center of the ellipse, is maximum along its major axis or transverse diameter, and a minimum along its perpendicular minor axis or conjugate diameter. An ellipse is symmetric about its major and minor axes. The foci of the ellipse are two special points on the ellipse's major axis and are equidistant from the center point of the ellipse (where the major and minor axes intersect). The sum of the distances from any point on the ellipse to those two foci is constant and equal to the major axis. Each of these two points is called a focus of the ellipse. An elliptic cylinder is a cylinder having an elliptic cross section.

Elliptic reflector 200 comprises an elliptic cylinder having an elliptic cross section. Elliptic reflector 200 thus has two foci, wherein light irradiated from one focus along the axial length of the elliptic cylinder is concentrated at the second focus along the axial length of the cylinder. Elliptic reflector surface 210 is an example of a light control device having an elliptic cylindrical shape and elliptic cross section, such that light rays 250 emanating from a single light source 230 at a first focal point (e.g., a focal point along an axis of the elliptic cylinder) of the elliptic reflector are directed to a second focal point 240 of the elliptic reflector (e.g., a focal point along a second axis of the elliptic cylinder). For UV curing, the interior surface of the elliptic reflector may be UV-reflective, to direct UV light substantially onto the surface of a workpiece located at the second focal point 240.

In single elliptic reflector devices with a single light source, the near-field workpiece surfaces (e.g., workpiece surfaces facing toward the light source) may receive light at higher intensities than the far-field workpiece surfaces (e.g., workpiece surfaces facing away from the light source). As such, single elliptic reflectors may also include a cylindrical back auxiliary reflector 260 in order to help in focusing UV light rays 264 emanating from light source 230 and being directed onto the far-field surface of the workpiece. Use of back auxiliary reflectors may be used thereby to provide for more uniform irradiation of a workpiece.

As described above, a conventional single elliptic reflector (e.g., elliptic reflector 200) has two foci, wherein light initiating from a light source (e.g., light source 230) at a first focal point may be substantially concentrated at a second focal point (e.g., second focal point 240).

Referring to FIG. 3, a curing device 300 is shown. The curing device 300 (which may be referred to herein as a UV curing device, UV curing system, and/or photoreactive system) is shown with stipple shading in FIG. 3 to indicate an irradiance of portions of the curing device 300 during operation of the curing device 300, as described further below. Curing device 300 includes a first elliptic reflector 302 and a second elliptic reflector 304 in a nested arrangement. First elliptic reflector 302 and second elliptic reflector 304 may also be referred to as nested elliptic reflectors. The first elliptic reflector 302 may be referred to herein as a first elliptic cylindrical reflector, and the second elliptic reflector 304 may be referred to herein as a second elliptic cylindrical reflector. In particular, the second elliptic reflector 304 is housed within an interior 303 of the first elliptic reflector 302. Minor axis 308 of the first elliptic reflector 302 is arranged coaxially with minor axis 306 of the second elliptic reflector 304, and major axis 310 of the first elliptic reflector 302 is arranged coaxially with major axis 312 of the second elliptic reflector 304. The second elliptic reflector 304 is smaller than the first elliptic reflector 302, with the minor axis 306 of the second elliptic reflector 304 having a smaller amount of length relative to the minor axis 308 of the first elliptic reflector.

The first elliptic reflector 302 and the second elliptic reflector 304 are arranged such that they substantially share a co-located focus 314. The co-located focus 314 represents a first focus of the first elliptic reflector 302 and a first focus of the second elliptic reflector 304, with the first focus of the first elliptic reflector 302 and the first focus of the second elliptic reflector 304 being arranged at substantially the same spatial location and being referred to herein collectively as the co-located focus 314. The first elliptic reflector 302 includes reflective interior surfaces 316, and the second elliptic reflector 304 includes reflective interior surfaces 318. Additionally, the second focus 322 may be a focus of each of the first elliptic reflector 302 and the second elliptic reflector 304, where second focus 322 is arranged opposite to the co-located focus 314. The co-located focus 314 is arranged closer to a closed, first end 311 of the first elliptic reflector 302 than an open, second end 313 of the first elliptic reflector 302, while the second focus 322 is arranged closer to the open, second end 313 of the first elliptic reflector 302 than the closed, first end 311 of the first elliptic reflector 302.

A light source 320 may be positioned at or in the vicinity or encompassing a second focus 322 located opposite to the co-located focus 314 along the major axis 312 and major axis 310. The light source 320 may, for example, be an individual LED device comprising an array of LEDs, or an array of LED arrays. In this arrangement, the nested elliptic surfaces can substantially concentrate light irradiated from the light source 320 positioned at, or in the vicinity of, the second focus 322 of the nested elliptic reflectors onto the surfaces of workpiece 324 positioned at the co-located focus 314. The workpiece 324 may be arranged within a sample tube 326, where a material of the sample tube 326 (e.g., glass, quartz, etc.) is substantially transparent to light emitted by the light source 320. Additionally, the material of the sample tube may have a suitably low index of refraction so as to direct a larger amount of light rays generated by the light source 320 to the workpiece 324 within the sample tube 326. The sample tube 326 is arranged within the curing device 300, with a central axis of the sample tube 326 substantially centered about the co-located focus 314. In the example shown by FIG. 3, the sample tube 326 may have a diameter of 22 millimeters. However, in other examples (e.g., the example shown by FIG. 5 and described further below), the sample tube may have a different diameter. In yet other examples, the workpiece 324 may be arranged at the co-located focus 314 within the interior of the curing device 300 without the sample tube 326. For example, the workpiece 324 may extend within the curing device 300 and may be centered at the co-located focus 314 without being enclosed by the sample tube 326 (e.g., the sample tube 326 may be omitted from the interior of the curing device 300).

In this configuration, due to the reflection of the light rays generated by the light source 320 via the reflective interior surfaces 316 and reflective interior surfaces 318, an amount of illumination of the workpiece 324 may be maintained at a desired amount of illumination more easily, and the curing device 300 may be manufactured or assembled without back reflectors. As a result, a cost and/or complexity of the curing device 300 may be reduced. In this manner, the configuration exemplified in FIG. 3 can also potentially achieve higher irradiation intensity and more uniform irradiation intensity across the workpiece surfaces relative to single elliptic reflector UV curing devices. Achieving higher and more uniform irradiation intensity may potentially allow for increased production rates and/or shorter curing times, thereby reducing product manufacturing costs.

With regard to the nested elliptic reflectors, UV light can be concentrated more uniformly across all surfaces of the workpiece relative to configurations with single elliptic reflectors, while maintaining high intensity as compared to single elliptic UV curing devices. Furthermore, because nested elliptic reflectors are utilized, light irradiated from the light source can substantially be directed to the surface of the workpiece, even when there may be slight misalignment of the workpiece from the co-located focus, or slight misalignment of one or more light sources from one of the foci. Furthermore, in cases where the cross section of the workpiece may be irregularly shaped or asymmetrical, or in cases where the workpiece cross section may be large, light irradiated from the light sources can be substantially directed to the surface of the workpiece, when nested elliptic reflectors are utilized.

The nested elliptic reflector configuration of the curing device 300 may additionally reduce a size of the curing device 300 relative to curing devices that do not include the nested configuration. For example, a size of the curing device 300 may be reduced relative to curing devices that include dual elliptic reflectors in a non-nested configuration (e.g., configurations in which a minor axis of a first elliptic reflector is not arranged coaxially with a minor axis of a second elliptic reflector). The reduced size of the curing device 300 may increase an ease of handling and/or transportation of the curing device 300, and with the reduced size of the curing device 300 the light source 320 may be positioned closer to the workpiece 324, which may increase an amount of light absorbed by the workpiece 324 and may increase a rate of curing of the workpiece 324. Additionally, because the second elliptic reflector 304 is nested within the first elliptic reflector 302, a likelihood of degradation of the second elliptic reflector 304 may be reduced (e.g., while transporting the curing device 300). Further still, the nested configuration of the first elliptic reflector 302 and second elliptic reflector 304 may reduce a manufacturing complexity of the curing device 300 (e.g., a molding and/or casting complexity, reflective surface coating complexity, etc.) relative to curing devices that do not include elliptic reflectors in the nested configuration (e.g., curing devices that include dual elliptic reflectors in axially offset or non-concentric configurations).

Reflective interior surfaces 316 and reflective interior surfaces 318 may be substantially elliptic, or at least partially elliptic. The first elliptic reflector 302 and second elliptic reflector 304 are each formed as substantially elliptic cylinders, with light irradiated from the light source 320 arranged at second focus 322 being reflected by the reflective interior surfaces 316 and reflective interior surfaces 318 toward the co-located focus 314. For example, the shapes of reflective interior surfaces 316 and reflective interior surfaces 318 may depart slightly from perfectly elliptic without substantially compromising the convergence of light irradiated by light source 320 at co-located focus 314. As a further example, shapes of surfaces reflective interior surfaces 316 and reflective interior surfaces 318 departing slightly from perfectly elliptic can include faceted elliptic surfaces, wherein the general shape of the first elliptic reflector 302 and second elliptic reflector 304 may be elliptic, but with individual sections faceted to slightly depart from an ellipse. Faceted or partially faceted elliptic surfaces may potentially allow for control of reflected light in a manner that enhances light uniformity or intensity at the workpiece surface for a given light source. For example, the facets may be flat or curved, smooth or continuous in nature, to approximate an elliptic shape, and may deviate slightly from an elliptic shape to account for the emission shape of the light source, thereby improving irradiance at a workpiece surface. Each of the facets may be flat, with corners connecting a plurality of the flat facets to form the elliptic surface. Alternatively, the facets may have a curved surface.

The curing device 300 includes an opening 328 formed the first elliptic reflector 302. The opening 328 is arranged opposite to the co-located focus 314 and workpiece 324, and the opening 328 is symmetric about the major axis 310 and major axis 312. The opening 328 may aid in mounting, positioning and/or aligning, and integrating the first elliptic reflector 302 and second elliptic reflector 304 with other components of UV curing device 300, such as light source 320. Edges 332 of opening 328 are positioned such that opening 328 is not larger than a length 334 between opposing sides of the first elliptic reflector 302 at the second focus 322 in a direction parallel to the minor axis 308 of the first elliptic reflector 302. Further, the second elliptic reflector 304 includes a first aperture 340 arranged toward the opening 328 (e.g., at a first end of the second elliptic reflector 304) and a second aperture 342 arranged away from the opening 328 (e.g., at an opposing, second end of the second elliptic reflector 304). The first aperture 340 may provide access to the interior portions of the second elliptic reflector 304, while light rays 336 emitted by the light source 320 may pass through the second aperture 342 to intercept the workpiece 324 arranged at the co-located focus 314 (e.g., passing directly from the light source 320 to the workpiece 324 and/or reflecting via reflective interior surfaces 316 toward the workpiece 324).

As described above, curing device 300 is configured to receive workpiece 324 at sample tube 326, where the workpiece 324 may pass inside the sample tube 326, so that the central axis of the workpiece 324 and the central axis of the sample tube 326 are each parallel and each intercept the co-located focus 314. In this configuration, with the first elliptic reflector 302 and second elliptic reflector 304 arranged in the nested configuration, curing device 300 can substantially focus and direct light rays 336 irradiated from the light source 320 onto surfaces of the workpiece 324 in a substantially uniform manner and with high intensity. Herein, irradiating the workpiece in a substantially uniform manner may refer to irradiating all of the workpiece surfaces arranged within the curing device 300 with essentially the same irradiance (e.g., power per unit area). For example, workpiece 324 may comprise an optical fiber, and arranging the light source 320 substantially at the second focus 322 may facilitate irradiating the optical fiber with a beam of constant irradiance within a threshold distance surrounding the optical fiber. As an example, the threshold distance may comprise a constant beam of 1 mm surrounding the optical fiber. As a further example, the threshold distance may comprise a constant beam of 3 mm surrounding the optical fiber.

Furthermore, because the first elliptic reflector 302 and second elliptic reflector 304 are arranged in the nested configuration, the surfaces of the workpiece 324 can be uniformly irradiated, precluding using back reflectors or reflective surfaces other than the interior surfaces of the nested elliptic reflectors to direct the light onto the workpiece 324. Further still, for cases where the workpiece 324 passes within sample tube 326, the size of the sample tube 326 can be determined at least in part based on the size of elliptic reflectors to reduce a likelihood of contact of the sample tube 326 with the reflective interior surfaces 316 of the first elliptic reflector 302 and the reflective interior surfaces 318 of the second elliptic reflector 304. As described above, due to the nested configuration of the elliptic reflectors, the size of the curing device 300 may be reduced relative to curing devices that do not include the nested elliptic reflectors. Reducing the size of the curing device 300 may additionally aid in positioning the light source 320 closer to the workpiece 324 (e.g., configuring the size of the first elliptic reflector 302 and second elliptic reflector 304 such that a length between the co-located focus 314 and the second focus 322 in a direction of the major axis 310 and major axis 312 is reduced).

As shown, light irradiated from light source 320 may comprise light rays 336 which are reflected from reflective interior surfaces 316 of first elliptic reflector 302 and reflective interior surfaces 318 of second elliptic reflector 304 onto the surfaces of the workpiece 324. Light irradiated from light source 320 may further comprise light rays irradiated directly onto the surfaces of the workpiece 324 from light source 320.

The reflective interior surfaces 316 and reflective interior surfaces 318 may reflect visible and/or UV and/or IR light rays with minimal absorption or refraction of light. Alternately, the reflective interior surfaces 316 and reflective interior surfaces 318 may be dichroic such that a certain range of wavelengths of light may be reflected, whereas light of wavelengths outside a certain range may be absorbed at the reflective interior surfaces 316 and reflective interior surfaces 318. For example, the reflective interior surfaces 316 and reflective interior surfaces 318 may be designed to reflect UV and visible light rays, but absorb IR light rays. Such a reflective interior surface may be potentially useful for heat sensitive coatings or workpieces, or to moderate the rate and uniformity of the curing reaction at the surface of workpiece 324. On the other hand, the reflective interior surfaces 316 and reflective interior surfaces 318 may preferentially reflect both UV and IR since curing reactions can proceed more rapidly at higher temperatures.

As described above, workpiece 324 can include optical fibers. Workpiece 324 may additionally and/or alternatively include ribbons or cables having a range of sizes and dimensions. Workpiece 324 may also include a UV-curable cladding and/or surface coating, as well as UV-curable ink printed on its surface. UV-curable cladding can include one or more UV-curable polymer systems, and may also include more than one UV-curable layer, that may be UV-curable in one or more curing stages. UV-curable surface coatings may include a thin film, or an ink that is curable on the surface of the optical fiber or optical fiber cladding. For example, the workpiece may be an optical fiber comprising a core and cladding layer, and the cladding may include a coating comprising a UV-curable polymer such as a polyimide or acrylate polymer, or another one or more UV-curable polymers. As another example, a nested-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system, for example an epoxy system, comprising initiators, monomers, oligomers, and other additives.

During curing, the workpiece 324 may be pulled or drawn through the curing device 300 in the axial direction, inside the sample tube 326, wherein the workpiece 324 is axially centered substantially about the co-located focus 314. Furthermore, the sample tube 326 may be axially centered about the co-located focus 314, and may concentrically surround the workpiece 324. Sample tube 326 may be constructed of glass, or quartz or another optically and/or UV and/or IR transparent material, and may not be overly thick in dimension, such that the sample tube 326 does not block or substantially interfere with the light rays irradiated from light source 320, including light rays reflected from the reflective interior surfaces 316 of the first elliptic reflector 302 and reflective interior surfaces 318 of the second elliptic reflector 304 through the sample tube 326 onto the surfaces of workpiece 324. Sample tube 326 may have a circular cross-section, or sample tube 326 may possess another suitably shaped cross-section. Sample tube 326 may also contain an inerting gas such as nitrogen, carbon dioxide, helium, and the like, in order to sustain an inert atmosphere around the workpiece 324 and to reduce oxygen inhibition, which may slow the UV curing reaction.

Light source 320 may include one or more of semiconductor devices or arrays of semiconductor devices such as LED light sources, LED array light sources, or microwave-powered, or halogen arc light sources, or arrays thereof. For example, light source 320 may include a plurality of semiconductor devices similar to the semiconductor devices 19 described above with reference to FIG. 1. Furthermore, light source 320 substantially located at second focus 322, may extend along an axial length of the second focus 322, so as to extend along a length (e.g., axial length) of the first elliptic reflector 302 and a length (e.g., axial length) of the second elliptic reflector 304 of the curing device 300. Light source 320, particularly arrays of light sources, or arrays of arrays of light sources, may further encompass or extend beyond second focus 322 along or at points along the length of the first elliptic reflector 302 and the length of the second elliptic reflector 304. In this manner, light irradiated from light source 320 along the length of first elliptic reflector 302 and the length of the second elliptic reflector 304 is substantially redirected to the surfaces of the workpiece 324 along the entire length of the workpiece 324.

Furthermore, light source 320 may emit one or more of visible, UV, or IR light. As another example, light source 320 may irradiate UV light of a first spectrum during a first time period, and then may irradiate UV light of a second spectrum during a second time period. The first and second spectrums emitted by light source 320 may or may not overlap. For example, if the light source 320 comprises a first LED array with a first type of LED light source and a second LED array with a second type of LED light source, then their emission spectra may or may not overlap. Furthermore, the intensities of light irradiated by light source 320 from the first LED array and the second LED array may be identical or they may be different, and their intensities can be independently controlled by an operator via a controller 14 or coupling electronics 22. In this manner, both the light intensity and wavelengths of light source 320 can be flexibly and independently controlled for achieving uniform UV irradiation and UV cure of a workpiece. For instance, if the workpiece 324 is irregularly shaped, and/or is not symmetrical about the co-located focus 314 of the first elliptic reflector 302 and second elliptic reflector 304, the curing device 300 may irradiate one portion of the workpiece 324 differentially from another portion to achieve uniform cure. As another example, if different coatings or inks are applied to the surface of the workpiece 324, the curing device 300 may irradiate one portion of the workpiece 324 differentially from another portion in order to provide a complete curing of each of the different coatings or inks applied to the workpiece 324.

By configuring the curing device 300 to include the second elliptic reflector 304 in the nested configuration with the first elliptic reflector 302, a curing rate associated with the curing device 300 may be increased, and a uniformity of the curing of the workpiece 324 via the curing device 300 may be increased. For example, workpiece 324 may include a coating configured to be cured via exposure to UV light. If the coating is non-uniform or unevenly applied to the workpiece, the workpiece may experience non-uniform forces while the coating expands or contracts. If the workpiece is an optical fiber, the uneven coating may result in an increased likelihood of signal attenuation. Achieving a more uniform curing of the coating may include providing a higher percent conversion of reactive monomer and oligomer, and higher degree of cross-linking in the polymer system, in addition to achieving concentric coatings around the workpiece that have an approximately constant thickness and are continuous over the application length of the workpiece (e.g., an optical fiber).

Achieving faster curing rates in a continuous or batch manufacturing process of optical fibers, cables, ribbons, or the like, may potentially reduce the manufacturing time and costs. Furthermore, achieving more uniform cure may potentially impart higher durability and strength to the workpiece. In the case of an optical fiber coating, increased coating uniformity may potentially preserve the fiber strength, thereby potentially increasing the durability of the optical fiber with respect to preventing attenuation of signal transmission due to phenomena such as microbending deformations, stress corrosion, or other mechanical damage in the optical fiber. Higher degrees of cross-linking may also potentially increase the chemical resistance of the coating, preventing chemical penetration and chemical corrosion or degradation of the optical fiber. Optical fibers may be severely degraded by surface defects. With conventional UV curing devices, curing rates may be increased at the expense of reduced cure uniformity; similarly, cure uniformity may be increased, but at the expense of lowering curing rates.

As described above, the curing device 300 is shown with stipple shading to indicate the irradiance of various portions of the interior 303 of the curing device 300 during operation of the curing device 300. In particular, the stipple shading indicating portions of the interior 303 of the curing device 300 that have a higher irradiance is illustrated with a larger stipple size, while the stipple shading indicating portions of the interior 303 of the curing device 300 that have a lower irradiance is illustrated with a smaller stipple size. Portions of the interior 303 of the curing device 300 proximate to the second focus 322 and the co-located focus 314 each have a higher irradiance relative to portions of the interior 303 that are located away from the second focus 322 and co-located focus 314, with the irradiance at the co-located focus 314 being higher than the irradiance at the second focus 322. For example, light rays 336 emitted by the light source 320 may intercept the workpiece 324 and be absorbed by surfaces of the workpiece 324 for curing of the workpiece 324, as described above. A portion of the light rays 336 may reflect back to the light source 320, but the portion of the light rays 336 reflecting back to the light source 320 may be smaller than the portion of the light rays 336 absorbed by the workpiece 324 (e.g., the workpiece 324 may absorb a majority of the light emitted by the light source 320 due to the reflection of the light rays 336 toward the co-located focus 314 by the reflective interior surfaces 316 of the first elliptic reflector 302 and the reflective interior surfaces 318 of the second elliptic reflector 304).

Referring to FIG. 4, a graph 400 including a plot 402 is shown indicating the irradiance at different locations within the interior 303 of the curing device 300 shown by FIG. 3 and described above. In particular, the vertical axis of graph 400 indicates incoherent irradiance, and the horizontal axis of graph 400 indicates position within the interior 303 of the curing device 300. The position labeled "0" along the horizontal axis may correspond to the location of the co-located focus 314 shown by FIG. 3 and described above, with positive values along the horizontal axis indicating locations arranged at the right-hand side of the co-located focus 314 as illustrated by FIG. 3 (e.g., toward the opening 328), and with negative values along the horizontal axis indicating locations arranged at the left-hand side of the co-located focus 314 as illustrated by FIG. 3 (e.g., away from the opening 328). The portion of the plot 402 arranged between the "30" and "40" values of the x-axis of graph 400 may correspond to the location of the second focus 322 shown by FIG. 3 and described above.

As shown by plot 402, the irradiance at the location of the co-located focus 314 has a higher peak value relative to the irradiance at other portions of the interior 303 of the curing device 300. As a result, the curing rate and curing uniformity of a workpiece arranged at the co-located focus 314, such as workpiece 324 shown by FIG. 3 and described above, may be increased. In some examples, the peak irradiance at the location of the co-located focus 314 may be 66.452 Watts per centimeter squared, and the total power output by the light source may be 109.53 Watts. In other examples, the peak irradiance and/or total power may have different values. However, in each example, the peak irradiance within the interior 303 of the curing device 300 occurs at the location of the co-located focus 314.

Referring now to FIG. 5, another example of a curing device 500 is shown. Curing device 500 may include several components configured similarly to those described above with reference to curing device 300 shown by FIG. 3 and described above. In particular, the curing device 500 includes a first elliptic reflector 502 and a second elliptic reflector 504, with the second elliptic reflector 504 housed within the first elliptic reflector 502 in a nested configuration. The first elliptic reflector 502 may be referred to herein as a first elliptic cylindrical reflector, and the second elliptic reflector 504 may be referred to herein as a second elliptic cylindrical reflector. The configuration of first elliptic reflector 502 may be similar to the first elliptic reflector 302 described above with reference to FIG. 3, and the configuration of the second elliptic reflector 504 may be similar to the second elliptic reflector 304 described above with reference to FIG. 3. The first elliptic reflector 502 and second elliptic reflector 504 each have a co-located focus 514, similar to the co-located focus 314 described above. In particular, the co-located focus 514 is a focus of each of the first elliptic reflector 502 and the second elliptic reflector 504. Reflective interior surfaces 516 of the first elliptic reflector 502 and reflective interior surfaces 518 of the second elliptic reflector 504 are configured to reflect light rays 536 emitted by light source 520 arranged at second focus 522 to workpiece 524 arranged at the co-located focus 514 within sample tube 526, similar to the example described above with reference to FIG. 3. The second focus 522 may be a focus of each of the first elliptic reflector 502 and the second elliptic reflector 504, where second focus 522 is arranged opposite to the co-located focus 514. The co-located focus 514 is arranged closer to a closed, first end 511 of the first elliptic reflector 502 than an open, second end 513 of the first elliptic reflector 502, while the second focus 522 is arranged closer to the open, second end 513 of the first elliptic reflector 502 than the closed, first end 511 of the first elliptic reflector 502. A material of the sample tube 526 (e.g., glass, quartz, etc.) is substantially transparent to light emitted by the light source 520 (e.g., at least 95% of light emitted by the light source 520 and incident to surfaces of the sample tube 526 may pass through the sample tube 526 without reflection by the sample tube 526, in some examples). The curing device 500 further includes an opening 528 disposed between edges 532, where the opening 528 may aid in mounting, positioning and/or aligning, and integrating the first elliptic reflector 502 and second elliptic reflector 504 with other components of curing device 500, such as light source 520. Second elliptic reflector 504 includes first aperture 540 and second aperture 542, where the first aperture 540 may provide access to interior portions of the second elliptic reflector 504, and light rays 536 emitted by the light source 520 may pass through the second aperture 542 to intercept the workpiece 524 arranged at the co-located focus 514.

The relative dimensions of the first elliptic reflector 502 and the second elliptic reflector 504 may be different compared to the relative dimensions of the first elliptic reflector 302 and second elliptic reflector 304 described above with reference to FIG. 3. In particular, a length 534 between opposing sides of the first elliptic reflector 502 at the second focus 522 may be larger than the length 334 described above with reference to FIG. 3. Additionally, a length of first elliptic reflector 502 along major axis 510 and/or minor axis 508 may be greater than the corresponding respective lengths of first elliptic reflector 302 shown by FIG. 3 and described above, and a length of second elliptic reflector 504 along major axis 512 and/or minor axis 506 may be greater than the corresponding respective lengths of second elliptic reflector 304 shown by FIG. 3 and described above. The enlarged size of one or each of first elliptic reflector 502 and second elliptic reflector 504 may provide additional interior space for accommodating the workpiece 524 and sample tube 526 relative to the curing device 300 described above with reference to FIG. 3. As one example, the sample tube 526 may have a diameter of 28 millimeters, as compared to the diameter of 22 millimeters provided as one example of the diameter of the sample tube 326 shown by FIG. 3 and described above. The larger sample tube 526 may accommodate larger workpieces relative to the sample tube 326, in some examples. In yet other examples, the workpiece 524 may be arranged at the co-located focus 514 within the interior of the curing device 500 without the sample tube 526. For example, the workpiece 524 may extend within the curing device 500 and may be centered at the co-located focus 514 without being enclosed by the sample tube 526 (e.g., the sample tube 526 may be omitted from the interior of the curing device 500).

Similar to the example described above with reference to FIG. 3, the curing device 500 shown by FIG. 5 is shown with stipple shading to indicate the irradiance of various portions of the interior 503 of the curing device 500 during operation of the curing device 500. The portions of the interior 503 that have a higher irradiance are illustrated with larger stipple size, while the portions of the interior that have a lower irradiance are illustrated with smaller stipple size. As indicated by the stipple shading, the irradiance at the co-located focus 514 is higher than the irradiance at the second focus 522.

Referring to FIG. 6, a graph 600 including a plot 602 is shown indicating the irradiance at different locations within the interior 503 of the curing device 500 shown by FIG. 5 and described above. In particular, the vertical axis of graph 600 indicates incoherent irradiance, and the horizontal axis of graph 600 indicates position within the interior 503 of the curing device 500. The position labeled "0" along the horizontal axis may correspond to the location of the co-located focus 514 shown by FIG. 5 and described above, with positive values along the horizontal axis indicating locations arranged at the right-hand side of the co-located focus 514 as illustrated by FIG. 5 (e.g., toward the opening 528), and with negative values along the horizontal axis indicating locations arranged at the left-hand side of the co-located focus 514 as illustrated by FIG. 5 (e.g., away from the opening 528). The portion of the plot 602 arranged between the "30" and "40" values of the x-axis of graph 600 may correspond to the location of the second focus 522 shown by FIG. 5 and described above.

As shown by plot 602, the irradiance at the location of the co-located focus 514 has a higher peak value relative to the irradiance at other portions of the interior 503 of the curing device 500. As a result, the curing rate and curing uniformity of a workpiece arranged at the co-located focus 514, such as workpiece 524 shown by FIG. 5 and described above, may be increased. In some examples, the peak irradiance at the location of the co-located focus 514 may be 53.494 Watts per centimeter squared, and the total power output by the light source may be 116.47 Watts. In other examples, the peak irradiance and/or total power may have different values. However, in each example, the peak irradiance within the interior 503 of the curing device 500 occurs at the location of the co-located focus 514.

Turning now to FIG. 7, a cross-sectional view of a curing device 700 is shown. The curing device 700 may be referred to herein as a photoreactive system, UV curing device, and/or a UV curing system. Curing device 700 is shown comprising a nested elliptic cylindrical reflector 775 comprising a cylindrical, first elliptic reflector 780 and a cylindrical, second elliptic reflector 790. The first elliptic reflector 780 may be similar to, or the same as, the first elliptic reflector 302 or first elliptic reflector 502 described above, and the second elliptic reflector 790 may be similar to, or the same as, the second elliptic reflector 304 or second elliptic reflector 504 described above. The curing device 700 may be similar to, or the same as, the curing device 300 or curing device 500 described above. The second elliptic reflector 790 is housed within the first elliptic reflector 780 (e.g., arranged within an interior space enclosed by the first elliptic reflector 780), such that the first elliptic reflector 780 and second elliptic reflector 790 are in a nested configuration. The first elliptic reflector 780 and second elliptic reflector 790 have a co-located focus 760, similar to co-located focus 314 and co-located focus 514 described above, with second focus 792 being similar to second focus 322 and second focus 522 described above. In particular, co-located focus 760 is a focus of each of the first elliptic reflector 780 and the second elliptic reflector 790. Additionally, second focus 792 may be a focus of each of the first elliptic reflector 780 and the second elliptic reflector 790, where second focus 792 is arranged opposite to the co-located focus 760. The co-located focus 760 is arranged closer to a closed, first end 791 of the first elliptic reflector 780 than an open, second end 793 of the first elliptic reflector 780, while the second focus 792 is arranged closer to the open, second end 793 of the first elliptic reflector 780 than the closed, first end 791 of the first elliptic reflector 780.

A light source 710 arranged at the second focus 792 may be at least partially housed within a housing 716, with the housing 716 including inlet and outlet piping connections 714 through which cooling fluid may circulate. Light source 710 may comprise one or more arrays of UV LED's positioned substantially along the second focus 792. Curing device 700 may further comprise mounting brackets 718 by which the housing 716 may attach to a reflector assembly baseplate 720. Curing device 700 may also include a sample tube 770 and a workpiece (not shown), for example an optical fiber, that is pulled or drawn within the sample tube 770 and positioned substantially about the central longitudinal axis of the sample tube 770. Longitudinal axis of sample tube 770 may be positioned substantially along the co-located focus 760 of the nested elliptic cylindrical reflector 775, wherein UV light originating from light source 710 may be substantially directed through the sample tube 770 to surfaces of the workpiece by the first elliptic reflector 780 and second elliptic reflector 790. Sample tube 770 may be constructed of quartz, glass or other material, and may have a cylindrical or other geometry, wherein UV light directed onto the external surface of the sample tube 770 may pass through the sample tube 770 without substantial refraction, reflection or absorption.

Reflector assembly baseplate 720 may be connected to reflector assembly faceplates 724, which may be mechanically fastened to either axial end of nested elliptic cylindrical reflector 775. Sample tube 770 may also be mechanically fastened to reflector assembly faceplates 724. In this manner, mounting brackets 718, reflector assembly faceplates 724 and reflector assembly baseplate 720 may serve to aid in aligning the light source 710, nested elliptic cylindrical reflector 775 and sample tube 770, wherein the light originating from light source 710 is substantially positioned about a second focus 792 of elliptic cylindrical reflector 790, wherein the sample tube is substantially positioned about a co-located focus of nested elliptic cylindrical reflector 775, and wherein UV light originating from light source 710 may be substantially directed through the sample tube 770 to surfaces of the workpiece by nested elliptic cylindrical reflector 775. Reflector assembly faceplate 724 may also include an alignment mechanism (not shown), where the alignment and/or position of the sample tube 770 may be adjusted after the reflector assembly faceplates 724, reflector assembly baseplate 720, first elliptic reflector 780, second elliptic reflector 790, and sample tube 770 have been assembled together. Reflector assembly baseplate 720 may also be connected along one side to a reflector assembly mounting plate 740. Reflector assembly mounting plate 740 may further be provided with one or more mounting slots 744 (see FIG. 8) and one or more mounting holes 748 (see FIG. 8) by which curing device 700 can be mounted. Curing device 700 may also include further connection ports 722 and 750 for other purposes such as for connecting electrical wiring conduits, mounting sensors, and the like. Furthermore, curing device 700 may comprise a reflector housing 712, and a cooling fan 715 mounted on the reflector housing 712 for removing heat from the curing device 700. In some examples, the second elliptic reflector 790 may be fixedly coupled to the first elliptic reflector 780 via one or more thin posts, such as posts 794. In some examples, the light source 710 may be arranged at the location of the second focus 792 via one or more thin posts, such as thin post 796.

Turning now to FIG. 8, a perspective cross-sectional view of the curing device 700 of FIG. 7 is shown, with reflector assembly faceplates 724 removed for illustrative purposes. In addition to the elements described above for FIG. 7, curing device 700 further comprises an opening or cavity 840 in reflector assembly baseplate 720 through which light irradiated from light source 710 (shown by FIG. 7) is transmitted. As shown in FIG. 8, cavity 840 may substantially span an axial length of the nested elliptic reflector 775. Light from light source 710 is irradiated along the entire length of the nested elliptic reflector 775. In addition to cooling fan 715 and inlet and outlet piping connections 714 for cooling fluid, reflector housing 712 may also comprise finned surfaces 820 for aiding in heat dissipation away from the curing device 700.

In the curing device 700 of FIG. 7 and FIG. 8, the nested elliptic reflector 775 is shown as having a thin rounded sheet construction. In one example, the nested elliptic reflector may comprise shaped thin sheets of polished aluminum that may be cleanable, reuseable, and replaceable. In another example, fins may be added to the external surface (e.g. external relative to the irradiated surface from light source 710) to increase heat transfer surface area from the nested elliptic reflector 775.

Turning now to FIGS. 9 and 10, perspective and end cross-sectional views of another embodiment of a curing device 901 including a nested elliptic reflector 900 are shown. Nested elliptic reflector 900 includes a first elliptic reflector 950 and a second elliptic reflector 952 each having a co-located focus 982 (e.g., the co-located focus 982 is a focus of both of the first elliptic reflector 950 and second elliptic reflector 952). Nested elliptic reflector 900 comprises reflective interior surfaces 984 of first elliptic reflector 950 and reflective interior surfaces 994 of second elliptic reflector. Nested elliptic reflector 900 may be machined or cast metal, and polished to form reflective interior surfaces 984 and reflective interior surfaces 994. Alternately, nested elliptic reflector may be machined, molded, cast or extruded of glass, ceramic, or plastic and treated with a high reflectance coating to form reflective interior surfaces 984 and reflective interior surfaces 994. Further still, nested elliptic reflector may be fabricated in two halves, including a first half 900A and a second half 900B, with the two halves fit and/or joined together during assembly of the curing device 901. Nested elliptic reflector 900 further comprises finned surfaces 918 to increase heat transfer surface area. Mounting holes 966 may be provided on a underside 964 of the nested elliptic reflector 900 to facilitate mounting and positioning of the nested elliptic reflector 900 to other components of the curing device 901, such as a light source, light source housing, etc. Nested elliptic reflector 900 further comprises an opening or cavity 968 along its entire axial length. Cavity 968 is positioned along the major axis of the nested elliptic reflector 900 so that cavity 968 extends along second focus 992 of the nested elliptic reflector 900.

In this manner, a curing device may comprise a first elliptic cylindrical reflector housing a second elliptic cylindrical reflector, the first elliptic cylindrical reflector and the second elliptic cylindrical reflector arranged to have a co-located focus, and a light source located at a second focus, wherein light emitted from the light source is reflected to the co-located focus from the second elliptic cylindrical reflector and retro-reflected to the co-located focus from the first elliptic cylindrical reflector. Further still, a first elliptic cylindrical reflector major axis may be greater than a second elliptic cylindrical reflector major axis, and a first elliptic cylindrical reflector minor axis may be greater than a second elliptic cylindrical reflector minor axis.

The first elliptic cylindrical reflector and the second elliptic cylindrical reflector may be configured to receive a workpiece. Furthermore, the light source may comprise a power source, a controller, a cooling subsystem, and a light-emitting subsystem, the light-emitting subsystem including coupling electronics, coupling optics and a plurality of semiconductor devices, and the housing may contain the light source and include inlets and outlets for cooling subsystem fluid.

At least one of the first elliptic cylindrical reflector and the second elliptic cylindrical reflectors may be a dichroic reflector, and the plurality of semiconductor devices of the light source may comprise an LED array. The LED array may comprise a first LED and a second LED, the first LED and the second LED emitting UV light with different peak wavelengths. The curing device may further comprise a quartz tube axially centered around the co-located focus and concentrically surrounding the workpiece inside the curing device.

In another embodiment, a photoreactive system for UV curing, may comprise a power supply, a cooling subsystem, a light-emitting subsystem, and a UV light source. The light-emitting subsystem may comprise coupling optics, including a first elliptic cylindrical reflector housing a second elliptic cylindrical reflector, the first elliptic cylindrical reflector and the second elliptic cylindrical reflector having a co-located focus and arranged in a nested configuration. The photoreactive system may further comprise a controller, including instructions stored in memory executable to irradiate UV light from the UV light source, wherein the irradiated UV light is reflected by at least one of the first elliptic cylindrical reflector and the second elliptic cylindrical reflector and focused on to a surface of the workpiece. The controller may further comprise instructions executable to dynamically vary an intensity of the irradiated UV light, and the photoreactive system may further comprise the UV light source located substantially at the second focus, wherein the irradiated UV light comprises a beam of spatially constant intensity surrounding the workpiece.

Figure 11:
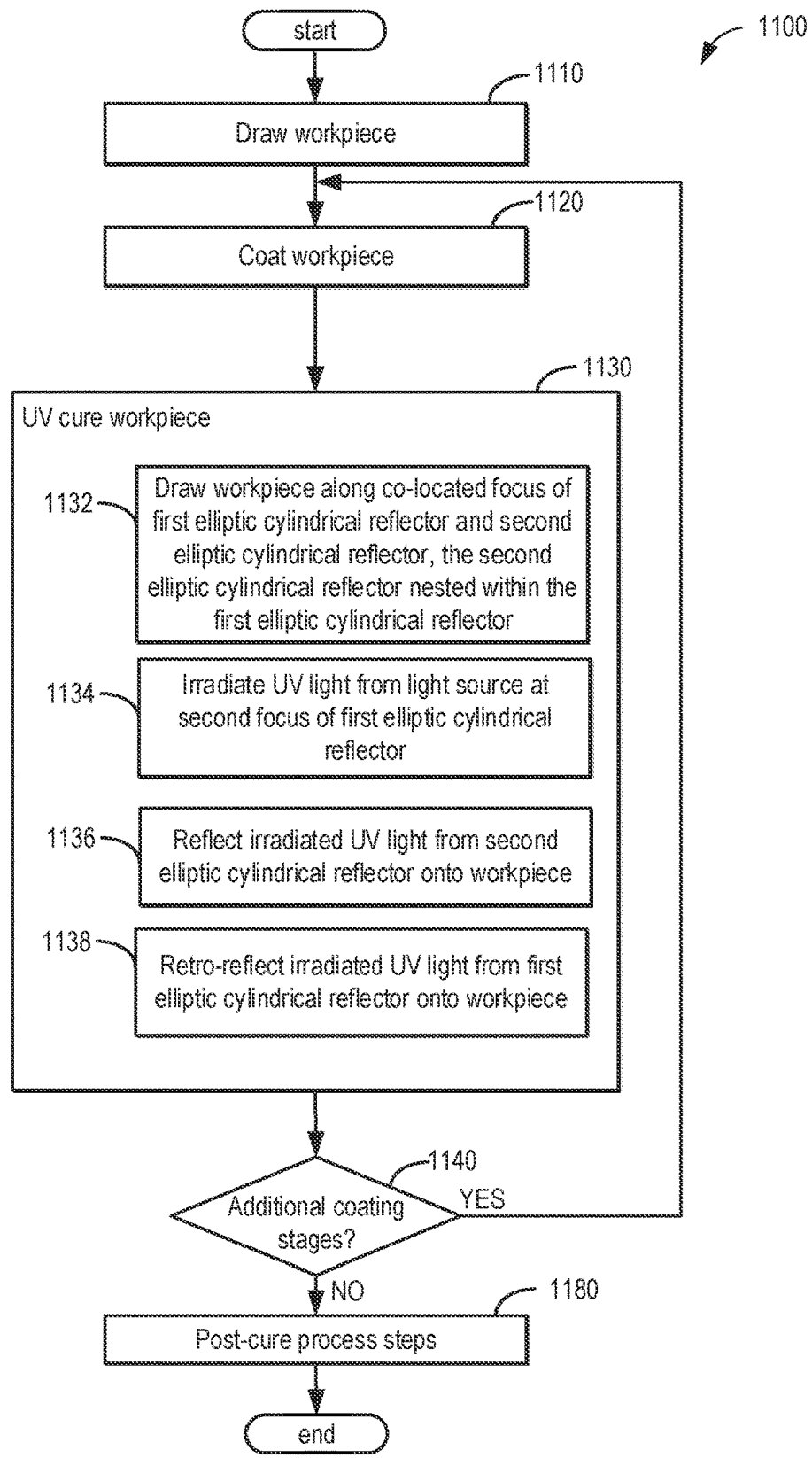
FIG. 11 illustrates a flowchart of an example method for curing a workpiece such as an optical fiber using a UV curing device including nested elliptic reflectors having a co-located focus.

Turning now to FIG. 11, a method 1100 of curing a workpiece is shown. In some examples, the workpiece may be an optical fiber, optical fiber coating, or another type of workpiece. Method 1100 begins at 1110, where a workpiece may be drawn, in the case of an optical fiber, from a preform, in a workpiece drawing step. Method 1100 then continues at 1120 where the workpiece is coated with a UV-curable coating or UV-curable polymer system using a predetermined coating process.

Next, method 1100 proceeds with 1130, wherein the workpiece may be UV-cured. During the UV curing at 1130, the workpiece may be pulled or drawn through a sample tube of one or a plurality UV curing devices at 1132. For example, the one or plurality of UV curing devices may include one or more of curing device 10, curing device 300, curing device 500, or curing device 901, arranged linearly in series. Furthermore, the workpiece may be positioned along a co-located focus of a nested elliptic reflector of the UV curing device, for example, a co-located focus of a first elliptic cylindrical reflector and a second elliptic cylindrical reflector (e.g., co-located focus 314 of first elliptic reflector 302 and second elliptic reflector 304 shown by FIG. 3 and described above). UV curing the workpiece may further include irradiating UV light from at least one LED array light source positioned at a second focus of the nested elliptic reflector at 1134. The irradiated UV light may be reflected by the second elliptic cylindrical reflector onto the surface of the workpiece at 1136, and retro-reflected onto the surface of the workpiece by the first elliptic cylindrical reflector at 1138. Accordingly irradiated UV light may be uniformly directed onto a surface of the workpiece.

In the case of drawing and UV curing optical fibers, the linear speed at which the optical fiber may be pulled or drawn can be very fast, and may exceed 20 m/s, for example. Arranging a plurality of UV curing devices in series may thus allow the coated length of optical fiber to receive a long enough UV exposure residence time in order to substantially complete curing of the optical fiber coating. In some examples, the effective length of the UV curing stage (for example, the number of UV curing devices arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster. In particular, using UV curing devices including a first elliptic cylindrical reflector housing a second elliptic cylindrical reflector with a co-located focus may potentially provide higher intensity and more uniform UV light irradiated and directed onto the surface of the workpiece, thereby providing both faster and more uniform cure of the workpiece. In this manner, optical fiber coatings and/or inks may be UV-cured at higher production rates, thereby lowering manufacturing costs.

Complete UV curing of the optical fiber coating may impart physical and chemical properties such as strength, durability, chemical resistance, fatigue strength, and the like. Incomplete or inadequate curing may degrade product performance qualities and other properties that can potentially cause premature failure and loss of performance of the optical fiber. In some examples, the effective length of the UV curing stage (for example, the number of UV curing devices arranged in series) is determined by taking into account the manufacturing rate, or draw or linear speed of the optical fiber or workpiece. Thus if the optical fiber linear speed is slower, the length or number of the UV curing system stage may be shorter than for cases where the optical fiber linear speed is faster.

Next, method 1100 continues at 1140, where it is determined if additional coating stages are required. In some examples, dual or multi-layer coatings may be applied to the surface of the workpiece, for example an optical fiber. As discussed above, optical fibers can be manufactured to include two protective concentric coating layers. For example, a dual-layer coating may also be used, wherein the workpiece may be coated with an inner layer that may have a soft and rubbery quality when cured for minimizing attenuation by microbending, and an outer layer, which may be stiffer and suited for protecting the workpiece (e.g. optical fiber) from abrasion and exposure to the environment (e.g., moisture, UV). The inner and outer layers may comprise a polymer system comprising initiators, monomers, oligomers, and other additives. If an additional coating step is to be performed, then method 1100 returns to 1120 where the optical fiber or other workpiece (now coated with a UV-cured first layer) is coated via an additional coating step followed by an additional UV curing. In FIG. 11, each coating step is shown as the coating step 1120 for simple illustrative purposes, however, each coating step may not be identical such that each coating step may apply different types of coatings, different coating compositions, different coating thicknesses, and impart different coating properties to the workpiece. In addition the coating step 1120 may use different processing conditions (e.g., temperature, coating viscosity, coating method). Similarly, UV curing the workpiece at 1130 for different coating layers or steps can involve a range of processing conditions. For example, in different UV cure steps, processing conditions such as UV light intensity, UV exposure time, UV light wavelength spectra, UV light source, and the like may be changed depending on the type of coating and/or coating properties.

Additional coating stages may also comprise printing or coating a UV curable ink or lacquer onto the surface of the workpiece, for example, for coloring or identification purposes. The printing may be carried out using a predetermined printing process, and may involve one or more multiple printing stages or steps. As such, UV curing at 1130 may comprise UV-curing a printed ink or lacquer on the surface of the workpiece. Similar to the UV curing step of the one or more optical fiber coatings, the printed ink or lacquer is UV-cured by pulling the workpiece positioned at the co-located focus of the first elliptic cylindrical reflector and the second elliptic cylindrical reflector of one or a plurality of UV curing devices arranged linearly in series, during which UV light is irradiated from the LED array light sources of the UV curing device(s) and directed by the nested elliptic cylindrical reflectors onto the surface of the optical fiber at the co-located focus.

If there are no additional coating stages, method 1100 continues at 1180 where any post-UV curing process steps are performed. As an example, for the case where the workpiece includes an optical fiber, post-UV curing process steps may include cable or ribbon construction, where a plurality of coated and printed and UV-cured optical fibers are combined into a flat ribbon, or a larger diameter cable composed of multiple fibers or ribbons. Other post-UV curing process steps may include co-extrusion of external cladding or sheathing of cables and ribbons.

In this manner, a method of curing a workpiece may comprise drawing the workpiece along a co-located focus of a first elliptic cylindrical reflector housing a second elliptic cylindrical reflector, irradiating UV light from a light source positioned at a second focus, reflecting the irradiated UV light from the second elliptic cylindrical reflector on to a surface of the workpiece, and retro-reflecting the irradiated UV light from the first elliptic cylindrical reflector onto the surface of the workpiece. Furthermore, drawing the workpiece along the co-located focus may comprise drawing at least one of an optical fiber, ribbon, or cable with at least one of a UV-curable coating, polymer, or ink. Further still, the LED array comprises a first LED and a second LED, wherein the first LED and the second LED emit UV light with different peak wavelengths.

The method may comprise dynamically varying an intensity of the irradiated UV light, and positioning the UV light source substantially at the second focus, wherein the irradiated UV light comprises a beam of spatially constant intensity surrounding the workpiece.

It will be appreciated that the configurations disclosed herein are exemplary in nature, and that these specific embodiments are not to be considered in a limiting sense, because numerous variations are possible. For example, the above embodiments can be applied to workpieces other than optical fibers, cables, and ribbons. Furthermore, the UV curing devices and systems described above may be integrated with existing manufacturing equipment and are not designed for a specific light source. As described above, any suitable light engine may be used such as a microwave-powered lamp, LED's, LED arrays, and mercury arc lamps. The subject matter of the present disclosure includes all novel and non-obvious combinations and subcombinations of the various configurations, and other features, functions, and/or properties disclosed herein.

Note that the example process flows described herein can be used with various UV curing devices and UV curing system configurations. The process flows described herein may represent one or more of any number of processing strategies such as continuous, batch, semi-batch, and semi-continuous processing, and the like. As such, various acts, operations, or functions illustrated may be performed in the sequence illustrated, in parallel, or in some cases omitted. Likewise, the order of processing is not necessarily called for to achieve the features and advantages of the example embodiments described herein, but is provided for ease of illustration and description. One or more of the illustrated acts or functions may be repeatedly performed depending on the particular strategy being used. It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and subcombinations of the various systems and configurations, and other features, functions, and/or properties disclosed herein.

In one embodiment, a curing device comprises: a larger, first elliptic cylindrical reflector and a smaller, second elliptic cylindrical reflector, with the second elliptic cylindrical reflector nested within an interior of the first elliptic cylindrical reflector, and with the first elliptic cylindrical reflector and the second elliptic cylindrical reflector arranged to have a co-located first focus. In a first example of the curing device, the curing device further comprises a light source located at a second focus of the first elliptic cylindrical reflector, wherein light emitted from the light source is reflected to the co-located first focus from the second elliptic cylindrical reflector and retro-reflected to the co-located first focus from the first elliptic cylindrical reflector, and wherein an entirety of the second elliptic cylindrical reflector is seated within the interior of the first elliptic cylindrical reflector, with the co-located first focus arranged at a first opening of the second elliptic cylindrical reflector, between a closed end of the first elliptic cylindrical reflector and an opposing, second opening of the second elliptic cylindrical reflector. A second example of the curing device optionally includes the first example, and further includes wherein a length of the first elliptic cylindrical reflector along a major axis of the first elliptic cylindrical reflector is greater than a length of the second elliptic cylindrical reflector along a major axis of the second elliptic cylindrical reflector, with the major axis of the first elliptic cylindrical reflector being coaxial with the major axis of the second elliptic cylindrical reflector. A third example of the curing device optionally includes one or both of the first and second examples, and further includes wherein a length of the first elliptic cylindrical reflector along a minor axis of the first elliptic cylindrical reflector is greater than a length of the second elliptic cylindrical reflector along a minor axis of the second elliptic cylindrical reflector, with the minor axis of the first elliptic cylindrical reflector being coaxial with the minor axis of the second elliptic cylindrical reflector. A fourth example of the curing device optionally includes one or more or each of the first through third examples, and further includes wherein a difference between the length of the first elliptic cylindrical reflector along the major axis of the first elliptic cylindrical reflector and the length of the second elliptic cylindrical reflector along the major axis of the second elliptic cylindrical reflector is equal to a difference between the length of the first elliptic cylindrical reflector along the minor axis of the first elliptic cylindrical reflector and the length of the second elliptic cylindrical reflector along the minor axis of the second elliptic cylindrical reflector. A fifth example of the curing device optionally includes one or more or each of the first through fourth examples, and further includes wherein the first elliptic cylindrical reflector and the second elliptic cylindrical reflector are configured to receive a workpiece, with the second elliptic cylindrical reflector disposed between the workpiece and the first elliptic cylindrical reflector. A sixth example of the curing device optionally includes one or more or each of the first through fifth examples, and further includes wherein: reflective surfaces of the first elliptic cylindrical reflector are spaced apart from reflective surfaces of the second elliptic cylindrical reflector in a direction along a minor axis of the first elliptic cylindrical reflector and a minor axis of the second elliptic cylindrical reflector; the light source comprises a power source, a controller, a cooling subsystem, and a light-emitting subsystem, the light-emitting subsystem including coupling electronics, coupling optics and a plurality of semiconductor devices; and a housing of the light source includes inlets and outlets for cooling subsystem fluid. A seventh example of the curing device optionally includes one or more or each of the first through sixth examples, and further includes a quartz tube axially centered around the co-located first focus and concentrically surrounding the workpiece inside the curing device between the first elliptic cylindrical reflector and the second elliptic cylindrical reflector. An eighth example of the curing device optionally includes one or more or each of the first through seventh examples, and further includes wherein the plurality of semiconductor devices of the light source comprises an LED array. A ninth example of the curing device optionally includes one or more or each of the first through eighth examples, and further includes wherein the LED array comprises a first LED and a second LED, the first LED and the second LED emitting UV light with different peak wavelengths. A tenth example of the curing device optionally includes one or more or each of the first through ninth examples, and further includes wherein at least one of the first elliptic cylindrical reflector and the second elliptic cylindrical reflectors is a dichroic reflector.

In one embodiment, a photoreactive system for UV curing comprises: a power supply; a cooling subsystem; a light-emitting subsystem comprising: coupling optics, including a first elliptic cylindrical reflector and a second elliptic cylindrical reflector sharing a co-located focus, the second elliptic cylindrical reflector housed within the first elliptic cylindrical reflector; a workpiece disposed within an interior of each of the first elliptic cylindrical reflector and the second elliptic cylindrical reflector; and a UV light source located substantially at a second focus of the first elliptic cylindrical reflector; and a controller, including instructions stored in memory that when executed, cause the controller to: irradiate UV light from the UV light source, wherein the irradiated UV light is reflected by reflective surfaces of the first elliptic cylindrical reflector and reflective surfaces of the second elliptic cylindrical reflector, where the irradiated UV light reflected by the reflective surfaces first elliptic cylindrical reflector is reflected through an opening of the second elliptic cylindrical reflector and focused on to the workpiece. In a first example of the photoreactive system for UV curing, the controller further comprises instructions stored in memory that when executed, cause the controller to: dynamically vary an intensity of the irradiated UV light. A second example of the photoreactive system for UV curing optionally includes the first example, and further includes wherein the irradiated UV light reflected by the reflective surfaces of the first elliptic cylindrical reflector through the opening of the second elliptic cylindrical reflector and the irradiated UV light reflected by the reflective surfaces of the second elliptic cylindrical reflector forms a beam of spatially constant intensity surrounding the workpiece.

In one embodiment, a method comprises: positioning a workpiece along a major axis of a first elliptic cylindrical reflector and a coaxial major axis of a second elliptic cylindrical reflector, the second elliptic cylindrical reflector nested within the first elliptic cylindrical reflector; positioning a light source within an interior of the first elliptic cylindrical reflector and the second elliptic cylindrical reflector; and emitting light from the light source, wherein the emitted light is reflected onto the workpiece by reflective surfaces of the second elliptic cylindrical reflector and by reflective surfaces of the first elliptic cylindrical reflector through an opening of the second elliptic cylindrical reflector. In a first example of the method, the method further includes the workpiece arranged at a co-located focus of the first elliptic cylindrical reflector and the second elliptic cylindrical reflector. A second example of the method optionally includes the first example, and further includes wherein the emitted light reflected onto the workpiece by the reflective surfaces of the second elliptic cylindrical reflector through the opening of the second elliptic cylindrical reflector is emitted through the opening in a first direction toward the first elliptic cylindrical reflector and reflected in a second direction toward the workpiece. A third example of the method optionally includes one or both of the first and second examples, and further includes wherein the emitted light is singly reflected from the reflective surfaces of the first elliptic cylindrical reflector prior to reaching the workpiece. A fourth example of the method optionally includes one or more or each of the first through third examples, and further includes wherein the emitted light is multiply reflected from the reflective surfaces of the second elliptic cylindrical reflector prior to reaching workpiece. A fifth example of the method optionally includes one or more or each of the first through fourth examples, and further includes wherein the light source comprises an LED array including a first LED and a second LED, wherein light is emitted from the first LED with a first peak wavelength and from the second LED with a second peak wavelength.

FIGS. 3, 5, and 7-10 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Note that the example control and estimation routines included herein can be used with various system configurations. The control methods and routines disclosed herein may be stored as executable instructions in non-transitory memory and may be carried out by the control system including the controller in combination with the various sensors, actuators, and other hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the control system, where the described actions are carried out by executing the instructions in a system including the various hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A curing device, comprising:
a larger, first elliptic cylindrical reflector and a smaller, second elliptic cylindrical reflector, with the second elliptic cylindrical reflector nested within an interior of the first elliptic cylindrical reflector, and with the first elliptic cylindrical reflector and the second elliptic cylindrical reflector arranged to have a co-located first focus, and a minor axis of the first elliptic cylindrical reflector is coaxial with a minor axis of the second elliptic cylindrical reflector.

2. The curing device of claim 1, further comprising a light source located at a second focus of the first elliptic cylindrical reflector, wherein light emitted from the light source is reflected to the co-located first focus from the second elliptic cylindrical reflector and retro-reflected to the co-located first focus from the first elliptic cylindrical reflector, and wherein an entirety of the second elliptic cylindrical reflector is seated within the interior of the first elliptic cylindrical reflector, with the co-located first focus arranged at a first opening of the second elliptic cylindrical reflector, between a closed end of the first elliptic cylindrical reflector and an opposing, second opening of the second elliptic cylindrical reflector.

3. The curing device of claim 1, wherein a length of the first elliptic cylindrical reflector along a major axis of the first elliptic cylindrical reflector is greater than a length of the second elliptic cylindrical reflector along a major axis of the second elliptic cylindrical reflector, with the major axis of the first elliptic cylindrical reflector being coaxial with the major axis of the second elliptic cylindrical reflector.

4. The curing device of claim 3, wherein a length of the first elliptic cylindrical reflector along the minor axis of the first elliptic cylindrical reflector is greater than a length of the second elliptic cylindrical reflector along the minor axis of the second elliptic cylindrical reflector, with the minor axis of the first elliptic cylindrical reflector being coaxial with the minor axis of the second elliptic cylindrical reflector.

5. The curing device of claim 4, wherein a difference between the length of the first elliptic cylindrical reflector along the major axis of the first elliptic cylindrical reflector and the length of the second elliptic cylindrical reflector along the major axis of the second elliptic cylindrical reflector is equal to a difference between the length of the first elliptic cylindrical reflector along the minor axis of the first elliptic cylindrical reflector and the length of the second elliptic cylindrical reflector along the minor axis of the second elliptic cylindrical reflector.

6. The curing device of claim 1, wherein the first elliptic cylindrical reflector and the second elliptic cylindrical reflector are configured to receive a workpiece, with the second elliptic cylindrical reflector disposed between the workpiece and the first elliptic cylindrical reflector.

7. The curing device of claim 1, wherein:
reflective surfaces of the first elliptic cylindrical reflector are spaced apart from reflective surfaces of the second elliptic cylindrical reflector in a direction along the minor axis of the first elliptic cylindrical reflector and the minor axis of the second elliptic cylindrical reflector;
the light source comprises a power source, a controller, a cooling subsystem, and a light-emitting subsystem, the light-emitting subsystem including coupling electronics, coupling optics and a plurality of semiconductor devices; and
a housing of the light source includes inlets and outlets for cooling subsystem fluid.

8. The curing device of claim 7, further comprising a quartz tube axially centered around the co-located first focus and concentrically surrounding a workpiece inside the curing device between the first elliptic cylindrical reflector and the second elliptic cylindrical reflector.

9. The curing device of claim 7, wherein the plurality of semiconductor devices of the light source comprises an LED array.

10. The curing device of claim 9, wherein the LED array comprises a first LED and a second LED, the first LED and the second LED emitting UV light with different peak wavelengths.

11. The curing device of claim 1, wherein at least one of the first elliptic cylindrical reflector and the second elliptic cylindrical reflectors is a dichroic reflector.

12. A photoreactive system for UV curing, comprising:
a power supply;
a cooling subsystem;
a light-emitting subsystem comprising:
coupling optics, including a first elliptic cylindrical reflector and a second elliptic cylindrical reflector sharing a co-located focus, the second elliptic cylindrical reflector housed within the first elliptic cylindrical reflector, wherein a minor axis of the first elliptic cylindrical reflector is coaxial with a minor axis of the second elliptic cylindrical reflector;
a workpiece disposed within an interior of each of the first elliptic cylindrical reflector and the second elliptic cylindrical reflector; and
a UV light source located substantially at a second focus of the first elliptic cylindrical reflector; and
a controller, including instructions stored in memory that when executed, cause the controller to: irradiate UV light from the UV light source, wherein the irradiated UV light is reflected by reflective surfaces of the first elliptic cylindrical reflector and reflective surfaces of the second elliptic cylindrical reflector, where the irradiated UV light reflected by the reflective surfaces first elliptic cylindrical reflector is reflected through an opening of the second elliptic cylindrical reflector and focused on to the workpiece.

13. The photoreactive system of claim 12, wherein the controller further comprises instructions stored in memory that when executed, cause the controller to: dynamically vary an intensity of the irradiated UV light.

14. The photoreactive system of claim 12, wherein the irradiated UV light reflected by the reflective surfaces of the first elliptic cylindrical reflector through the opening of the second elliptic cylindrical reflector and the irradiated UV light reflected by the reflective surfaces of the second elliptic cylindrical reflector forms a beam of spatially constant intensity surrounding the workpiece.

\* \* \* \* \*